US008127331B2

(12) United States Patent  
Heilbron et al.

(10) Patent No.: US 8,127,331 B2  
(45) Date of Patent: Feb. 28, 2012

(54) METHOD, SYSTEM AND APPARATUS FOR CONVEYING PERSONALIZED CONTENT TO A VIEWER

(75) Inventors: Maarten Boudewijn Heilbron, Toronto (CA); Peter Werner Ratsch, Toronto (CA)

(73) Assignee: BCE Inc., Verdun, Quebec (CA)

( * ) Notice: Subject to any disclaimer, the term of this patent is extended or adjusted under 35 U.S.C. 154(b) by 0 days.

(21) Appl. No.: 11/571,041

(22) PCT Filed: Dec. 20, 2005

(86) PCT No.: PCT/CA2005/001932  
§ 371 (c)(1),  
(2), (4) Date: Dec. 20, 2006

(87) PCT Pub. No.: WO2007/071003  
PCT Pub. Date: Jun. 28, 2007

(65) Prior Publication Data  
US 2008/0301736 A1 Dec. 4, 2008

(51) Int. Cl.  
G06F 3/00 (2006.01)  
G06F 13/00 (2006.01)  
H04N 5/445 (2011.01)

(52) U.S. Cl. .............................. 725/46; 725/47; 725/50
(58) Field of Classification Search .................. 725/61, 725/46–47  
See application file for complete search history.

(56) References Cited

U.S. PATENT DOCUMENTS

| 555,541 | A | * | 3/1896 | Haddad ........................ 400/307 |
| 5,210,611 | A | | 5/1993 | Yee et al. | |
| 5,793,438 | A | | 8/1998 | Bedard | |
| 5,861,881 | A | | 1/1999 | Freeman et al. | |
| 6,047,327 | A | | 4/2000 | Tso et al. | |
| 6,324,694 | B1 | | 11/2001 | Watts et al. | |
| 6,405,372 | B1 | | 6/2002 | Kim et al. | |
| 6,536,041 | B1 | | 3/2003 | Knudson et al. | |
| 6,766,524 | B1 | * | 7/2004 | Matheny et al. ................ 725/23 |
| 6,774,926 | B1 | * | 8/2004 | Ellis et al. ..................... 725/133 |
| 6,792,618 | B1 | | 9/2004 | Bendinelli et al. | |
| 6,839,901 | B1 | | 1/2005 | De Saint Marc et al. | |
| 7,174,560 | B1 | | 2/2007 | Crinon | |
| 7,191,243 | B2 | * | 3/2007 | Roy et al. ......................... 725/93 |
| 7,360,160 | B2 | * | 4/2008 | Matz ............................... 725/35 |

(Continued)

FOREIGN PATENT DOCUMENTS

CA 2 416 182 A1 1/2002

(Continued)

OTHER PUBLICATIONS

Office Action mailed on Nov. 6, 2009 in connection with Canadian Appl. No. 2,570,741.

(Continued)

*Primary Examiner* — Pankaj Kumar  
*Assistant Examiner* — Randy Flynn

(57) ABSTRACT

According to embodiments of the present invention a method, system and apparatus for conveying personalized content to a viewer is provided. A method for conveying personalized content comprises obtaining an indication of viewer-selected content and receiving an indication of a viewing time by which a target receiver device is required to have received the viewer-selected content. The method further comprises determining a delivery window based on the viewing time and generating a delivery component including the viewer-selected content and an identifier associated with the target receiver device. The method further comprises causing the delivery component to be delivered to the target receiver device during the delivery window.

34 Claims, 11 Drawing Sheets

U.S. PATENT DOCUMENTS

| | | | |
|---|---|---|---|
| 7,360,230 B1* | 4/2008 | Paz et al. | 725/47 |
| 7,650,423 B2* | 1/2010 | Carden | 725/50 |
| 2001/0003846 A1* | 6/2001 | Rowe et al. | 725/47 |
| 2001/0054182 A1* | 12/2001 | Lodola | 725/50 |
| 2002/0013943 A1 | 1/2002 | Haberman et al. | |
| 2002/0026462 A1 | 2/2002 | Shotton, Jr. et al. | |
| 2002/0040482 A1 | 4/2002 | Sextro et al. | |
| 2002/0059586 A1* | 5/2002 | Carney et al. | 725/35 |
| 2002/0059590 A1 | 5/2002 | Kitsukawa et al. | |
| 2002/0065678 A1 | 5/2002 | Peliotis et al. | |
| 2002/0083453 A1 | 6/2002 | Menez | |
| 2002/0143591 A1* | 10/2002 | Connelly | 725/32 |
| 2002/0144283 A1* | 10/2002 | Headings et al. | 725/46 |
| 2002/0157101 A1 | 10/2002 | Schrader et al. | |
| 2002/0166122 A1 | 11/2002 | Kikinis et al. | |
| 2002/0186296 A1 | 12/2002 | Gogoi et al. | |
| 2002/0188943 A1 | 12/2002 | Freeman et al. | |
| 2003/0004961 A1 | 1/2003 | Slothouber et al. | |
| 2003/0007092 A1 | 1/2003 | Sonner et al. | |
| 2003/0027592 A1 | 2/2003 | Hashimoto et al. | |
| 2003/0067554 A1* | 4/2003 | Klarfeld et al. | 725/135 |
| 2003/0084449 A1* | 5/2003 | Chane et al. | 725/46 |
| 2003/0133043 A1 | 7/2003 | Carr | |
| 2003/0149975 A1 | 8/2003 | Eldering et al. | |
| 2003/0222975 A1 | 12/2003 | Klosterman | |
| 2003/0233241 A1 | 12/2003 | Marsh | |
| 2004/0022278 A1 | 2/2004 | Thomas et al. | |
| 2004/0034873 A1 | 2/2004 | Zenoni | |
| 2004/0045028 A1 | 3/2004 | Harris | |
| 2004/0073437 A1 | 4/2004 | Halgas, Jr. et al. | |
| 2004/0073923 A1 | 4/2004 | Wasserman | |
| 2004/0109436 A1* | 6/2004 | Vargas et al. | 370/350 |
| 2004/0111756 A1* | 6/2004 | Stuckman et al. | 725/91 |
| 2004/0187151 A1 | 9/2004 | Dunstan | |
| 2005/0015803 A1 | 1/2005 | Macrae et al. | |
| 2005/0097600 A1 | 5/2005 | Heer | |
| 2005/0097619 A1* | 5/2005 | Haddad | 725/91 |
| 2005/0210502 A1 | 9/2005 | Flickinger et al. | |
| 2005/0251826 A1 | 11/2005 | Orr | |
| 2006/0064721 A1 | 3/2006 | Del Val et al. | |
| 2006/0123455 A1* | 6/2006 | Pai et al. | 725/46 |
| 2006/0184989 A1 | 8/2006 | Slothouber | |
| 2010/0180295 A1 | 7/2010 | Ratsch et al. | |

FOREIGN PATENT DOCUMENTS

| | | |
|---|---|---|
| EP | 0 263 635 A2 | 4/1988 |
| EP | 0920207 | 6/1999 |
| EP | 1 315 375 A2 | 5/2003 |
| EP | 1 622 371 A1 | 2/2006 |
| JP | 200217215 A | 6/2002 |
| JP | 2003284008 A | 10/2003 |
| JP | 2004199304 A | 7/2004 |
| WO | 99/30493 A1 | 6/1999 |
| WO | WO 99/63759 A3 | 12/1999 |
| WO | 00/33576 A1 | 6/2000 |
| WO | 00/74378 A1 | 12/2000 |
| WO | WO 01/03425 A1 | 1/2001 |
| WO | 01/78381 A2 | 10/2001 |
| WO | 02/087245 A1 | 10/2002 |
| WO | WO 2004/049208 A1 | 6/2004 |
| WO | WO 2004/063892 A3 | 7/2004 |
| WO | PCT/CA2005/001932 | 9/2006 |
| WO | PCT/CA2006/000626 | 1/2007 |
| WO | PCT/CA2006/001623 | 1/2007 |
| WO | PCT/CA2006/001440 | 6/2007 |

OTHER PUBLICATIONS

Office Action issued by the United States Patent and Trademark Office on Sep. 21, 2010 in connection with U.S. Appl. No. 12/063,197, 24 pages.

Office Action issued by the Canadian Intellectual Property Office on Oct. 4, 2010 in connection with Canadian Appl. No. 2,570,705, 5 pages.

Office Action issued by the United States Patent and Trademark Office on Aug. 6, 2010 in connection with U.S. Appl. No. 12/063,639, 26 pages.

Supplementary European Search Report issued by the European Patent Office on Nov. 30, 2010 in connection with European Appl. No. 06/741,396.3, 3 pages.

Office Action issued on Feb. 4, 2011 in connection with U.S. Appl. No. 12/063,639, 29 pages.

Office Action issued on Jan. 24, 2011 in connection with U.S. Appl. No. 12/063,197, 33 pages.

Non-Final Office Action issued by the United States Patent and Trademark Office on May 26, 2011 in connection with U.S. Appl. No. 12/063,639, 24 pages.

Nagravision, Conditional Access Solutions—Secure your Business and Drive Subscriber Revenue, http://www.nagravision.com/pdf/ConditionalAccessSolutions.pdf, 2 pages.

DNTV Live! EPG, http://digitalnow.com.au/manual/images/epg.jpg, Nov. 21, 2005, 1 page.

Channel Line-up by DSI—Thursday, Jan. 6, 2005, 11:26 AM, 1 page, http://www.displaysystemsintl.com/graphics/bottom_half_frame_shadow.jpg.

Bell Rings in Holidays with iTV: Marketnews.ca, Nov. 22, 2006, 3 pages, http://www.marketnews.ca/news_detail.asp?nid=2344.

Office Action mailed on Aug. 22, 2011 in connection with U.S. Appl. No. 12/1063,197, 29 pages.

Supplementary European Search Report issued by the European Patent Office on Nov. 4, 2011 in connection with European Patent Application Serial No. 06/790,618.0, 5 pages.

Office Action issued by the European Patent Office on Nov. 22, 2011 in connection with European Patent Application Serial No. 06/790618.0, 6 pages.

Final Office Action issued by the United States Patent and Trademark Office on Nov. 18, 2011 in connection with U.S. Appl. No. 12/063,639, 21 pages.

* cited by examiner

METHOD, SYSTEM AND APPARATUS FOR CONVEYING PERSONALIZED CONTENT TO A VIEWER

FIELD OF THE INVENTION

This invention relates generally to video delivery systems and more specifically to a method, system and apparatus for conveying personalized content to a viewer.

BACKGROUND OF THE INVENTION

Viewers of television programs these days are accustomed to receiving a vast amount of content, ranging from news and movies to talk shows and speciality programs. In order to accommodate the needs of even its average viewers, a service provider has to be able to offer a large number of channels, each channel catering to a different interest. From the service provider perspective, the biggest challenge is reconciling the ever-increasing demand for a larger selection of content with the finite bandwidth available to the service providers for distribution of such content. This problem is particularly acute in a Direct-to-Home (DTH) satellite broadcast environment, but is also experienced by service providers using other delivery media (such as cable distribution networks and IPTV distribution networks).

One recent phenomenon in the television distribution industry has been the experience of Interactive Television applications, commonly referred to as iTV applications. iTV applications create new possibilities for viewers, namely enabling viewers to enjoy interactive content. One illustrative implementation of iTV applications is a horoscope iTV application. The service provider acquires horoscope content from a content source, which in this case may be a popular psychic or an astrologist. The horoscope content for all zodiacs is compiled into an iTV application, which comprises a content module and a navigation module to enable viewers to navigate through the content module. When a particular viewer is interested in her horoscope, she would tune into a specific channel associated with the horoscope iTV application using a receiver device (such as a set-top box) connected to her television. Tuning to the specific channel would trigger downloading of the application and/or activation of an application stored in the receiver device's memory. Upon activation of the application, a menu from the navigation module is presented to the viewer enabling the viewer to choose particular content from the content available in the content module. For illustration purposes, assume that the viewer is a Sagittarius. Using the navigation keys of a remote control and an interface presented by the iTV application, the viewer can select a Sagittarius category and, thus, retrieve relevant horoscope information for Sagittarius.

As the thrust for greater interacting evolves, viewers are no longer satisfied with one-size-fits-all applications such as horoscopes. Rather, they demand increasingly personalized content. However, the principal limitation of the existing iTV applications is associated with the limited bandwidth available to the service providers. The limited bandwidth results in a limited amount of content that can be provided. Faced with this dilemma, service providers have resorted to statistical methods of attempting to satisfy most of their viewers' needs, most of the time, with as little bandwidth as possible. The service providers generally refer to this strategy as an 80/20 rule or as a "Pareto principle", i.e. twenty percent of available content, at each level of depth, should satisfy the interest of eighty percent of viewers. In an example, the service provider may select stocks traded on 20% of the world's stock exchanges. This is likely to satisfy interest of 80% of the viewers. However, in order to differentiate from the competition, the service provider may want to provide a service to the remaining 20% of viewers.

Therefore, there is a need for a solution that would deliver content tailored according to specific's viewer interest while overcoming the limited bandwidth problem.

SUMMARY OF THE INVENTION

The invention addresses at least one of the above stated needs and mitigates at least one of the stated problems.

According to a first broad aspect of the invention, there is provided a method comprising obtaining an indication of viewer-selected content, receiving an indication of a viewing time by which a target receiver device is required to have received the viewer-selected content. The method further comprises determining a delivery window based on the viewing time. The method further involves generating a delivery component including the viewer-selected content and an identifier associated with the target receiver device. The method further includes causing the delivery component to be delivered to the target receiver device during the delivery window.

According to a second broad aspect of the invention, there is provided an apparatus for delivering viewer-selected content. The apparatus comprises a first interface for distributing at least one content stream, a second interface and a control module coupled to the first and second interfaces. The control module operable to receive via the second interface an indication of viewer-selected content; receive via the second interface an indication of a viewing time by which a target receiver device is required to have received the viewer-selected content. The control module is further operable to determine a delivery window based on the viewing time and to generate a delivery component including the viewer-selected content and an identifier associated with the target receiver device. The control module is further operable to cause the delivery component to be delivered to the target receiver device via the first interface during the delivery window.

According to a third broad aspect of the invention, there is provided a set top box registered to a viewer. The set top box comprises a first interface operable to receive from a content provider a content stream and a second interface adapted to receive an indication of a viewer choice from the viewer, the indication of a viewer choice comprising an indication of viewer-selected content and an indication of a viewing time by which the set-top box is required to have received the viewer-selected content. The set-top box further comprises a processing unit operable to effect a transmission to the content provider of the indication of a viewer choice; the transmission being instrumental in causing a delivery component to be delivered to the set-top box before the viewing time, the delivery component comprising the viewer-selected content. The processing unit is further operable to wake up at a predetermined time before the viewing time to acquire the delivery component from the content provider via the first interface; to acquire the viewer-selected content by the viewing time; and to convey the viewer-selected content to the viewer.

According to a fourth broad aspect of the invention, there is provided a set top box registered to a viewer. The set top box comprises a first interface operable to receive from a content provider a content stream and a second interface adapted to receive an indication of a viewer choice from the viewer, the indication of a viewer choice comprising an indication of viewer-selected content and an indication of a viewing time by which a target receiver device is required to have received the viewer-selected content. The set top box further comprises a processing unit coupled to the first and second interfaces, the processing unit operable to effect a transmission to the content provider of the indication of viewer choice; the transmission being instrumental in:

causing a delivery component to be delivered to the target receiver device before the viewing time, the delivery component comprising the viewer-selected content;

causing the target receiver device to wake up at a pre-determined time before the viewing time to acquire the delivery component from the content provider via the first interface; and causing the target receiver to acquire the viewer-selected content by the viewing time.

According to another broad aspect of the invention, there is provided a set top box registered to a viewer. The set top box comprises a first interface operable to receive from a content provider a content stream and a second interface operable to receive an indication of a viewing time by which the set-top box is required to have received viewer-selected content. The set top box further includes a processing unit coupled to the first and second interfaces, the processing unit operable:

to wake up at a pre-determined time before the viewing time;

to acquire a delivery component comprising the viewer-selected content from the content stream by the viewing time; and to convey the viewer-selected content to the viewer.

According to another broad aspect of the invention, there is provided a system that comprises a target receiver device and a content provider for distributing a content stream to a plurality of receiver devices, the plurality of receiver devices including the target receiver device. The content provider operable to:

obtain an indication of viewer-selected content;

receive an indication of a viewing time by which the target receiver device is required to have received the viewer-selected content;

determine a delivery window based on the viewing time;

generate a delivery component including the viewer-selected content and an identifier associated with the target receiver device;

cause the delivery component to be delivered to the target receiver device during the delivery window.

BRIEF DESCRIPTION OF THE DRAWINGS

A detailed description of specific embodiments of the invention is provided herein below, by way of example only, with reference to the accompanying drawings, in which.

Figure 1:
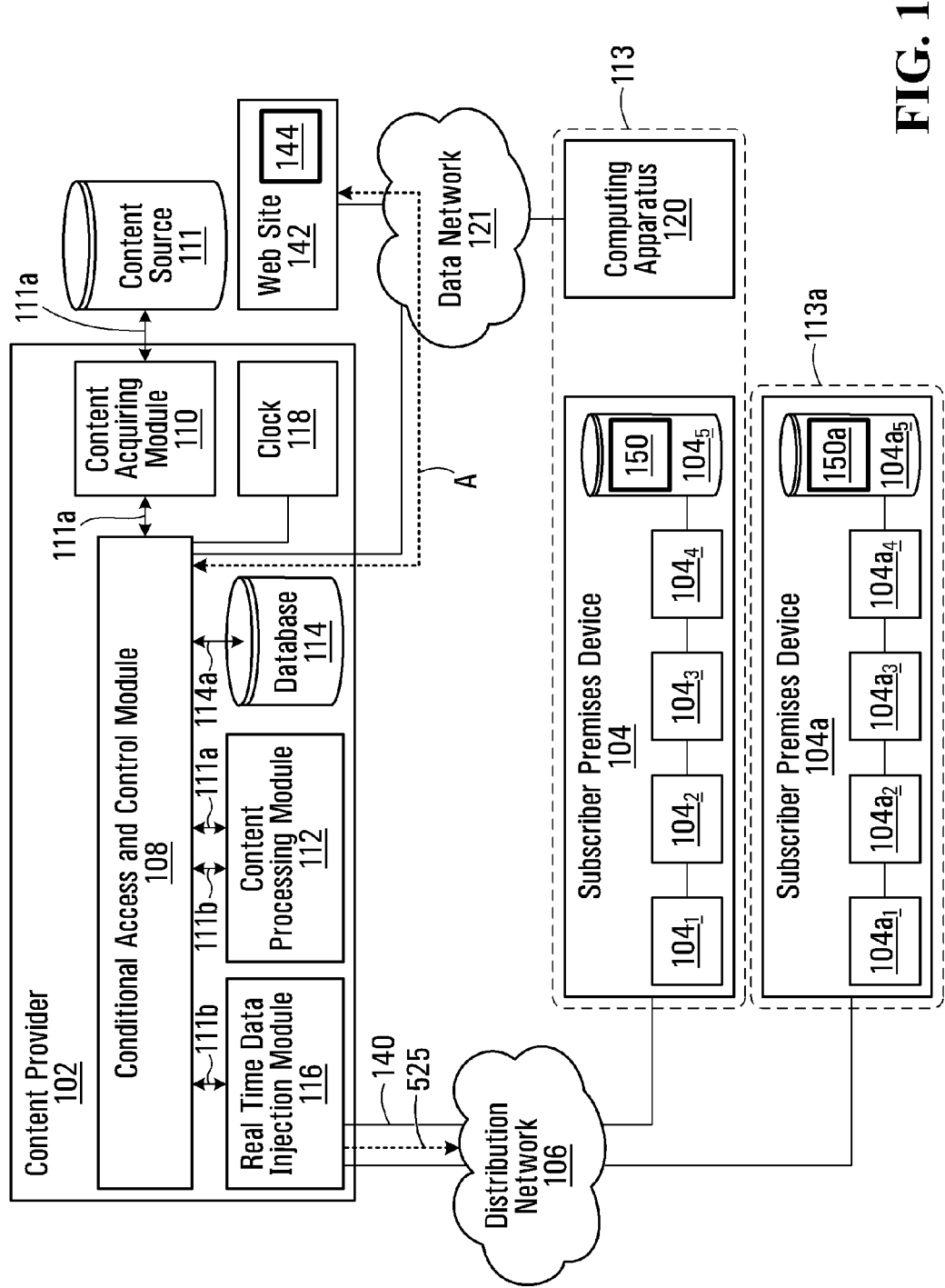
FIG. 1 is a conceptual block diagram showing various components of a system for conveying personalized content to a viewer.

In the drawings, the embodiments of the invention are illustrated by way of examples. It is to be expressly understood that the description and drawings are only for the purposes of illustration and are an aid for understanding. They are not intended to be a definition of the limits of the invention.

DETAILED DESCRIPTION OF THE EMBODIMENTS OF THE INVENTION

FIG. 1 depicts a block diagram of a system for conveying personalized content to a viewer. The system comprises a content provider 102. The content provider 102 is operable to acquire, multiplex and distribute multimedia content, such as video-audio content, iTV applications, and the like. The content provider 102 is coupled to a plurality of subscriber premises devices 104 via a distribution network 106. Two subscriber premises 113, 113a, however, are depicted. The system of FIG. 1 can comprise a number of additional subscriber premises that have been omitted from FIG. 1 for the sake of simplicity. Each subscriber premises 113 has an associated subscriber premises device 104. Specifically, the customer premises 113 comprises a customer premises device 104 and the customer premises 113a comprises a customer premises device 104a.

The content provider 102 is operable to deliver a content stream 140 to subscriber premises devices 104, 104a via the distribution network 106. It should be understood that the content provider 102 can deliver a number of other content streams. For the benefit of the reader, it should be noted that the term "content stream" used herein should be construed broadly and can encompass, depending on the implementation and the exact architecture used for the content provider 102 and the distribution network 106, one or more channels, one or more frequencies, one or more data streams, one or more distribution streams, one or more audio-video streams and so on. It should be further understood that the system of FIG. 1 is scalable and, as such, the content provider 102 can service a number of other subscriber premises devices 104. The content stream 140 can convey one or more television channels, one or more iTV applications, one or more delivery components, one or more control tokens, etc. In one specific non-limiting example depicted in FIG. 1, the content stream 140 can carry a channel 525 which may be associated with an iTV application, as will be described in greater detail herein below.

Generally speaking, the content provider 102 is operable to collect a variety of content from various content sources, multiplex various content streams, encode the multiplexed content streams for distribution and transmit the encoded content streams (such as the content stream 140) to the distribution network 106. The content provider 102 in such an embodiment can be further operable to deliver augmented services, such as pay-per-view, video-on-demand, etc., as well as perform conditional access and billing functions.

In some embodiments of the present invention, the content provider 102 can be a Direct to Home (DTH) satellite broadcaster of video and audio content. In this case, the distribution network 106 comprises a satellite uplink, a geostationary orbit satellite and earth repeaters for receiving, amplifying and broadcasting the content streams (such as the content stream 140) over the broadcasting footprint. All these components are known in the art and are omitted from FIG. 1 for the sake of simplicity.

In other embodiments of the present invention, the content provider 102 can be a cable provider. In these embodiments, the distribution network 106 can be a coaxial cable distribution network and can comprise the required amplifiers, switches and hubs, also known to those skilled in the art. In these embodiments, the subscriber premises device 104 can comprise a cable receiver device. Yet in further embodiments, the content provider 102 can be a video-over-IP content provider (herein below referred to as IPTV). In these embodiments, the subscriber premises device 104 can comprise an IPTV decoder operable to change into one or more channel streams distributed by the content provider 102 and the distribution network 106 can traverse a data network, such as the Internet or the like. Yet in another embodiment, the distribution network 106 can comprise an xDSL distribution system, such as but not limited to a VDSL (Very-high-rate Digital Subscriber Line) based distribution system, a VDSL (Very high DSL) based distribution system, etc.

It should be noted that the subscriber premises device 104 can comprise any suitable computing apparatus for receiving the content stream 140, and in particular, the subscriber premises device 104 comprises various components and interfaces. Firstly, the subscriber premises device 104 comprises a content interface $104_1$ for receiving the content stream 140 from the content provider 102. The content interface $104_1$ depends on the nature of the distribution network 106. For example, in the above-mentioned satellite broadcast scenario, the content interface $104_1$ can comprise a reception device (such as a satellite dish, an antenna or the like, typically installed outside the subscriber's premises, such as on the side of a house or on the roof), as well as outside/inside wiring between the reception device and the remainder of the subscriber premises device 104. A non limiting example of the reception device is manufactured by EchoStar of 9601 South Meridian Blvd., Englewood, Colo., USA. Alternatively, in the above-mentioned cable scenario, the content interface $104_1$ can comprises a coaxial cable interface. Alternatively, in the above-mentioned IPTV scenario, the content interface $104_1$ can comprise an Ethernet cable connection and can support various access technologies, such as DSL, cable, fiber-to-the-home and the like. In the above-mentioned xDSL scenario, the content interface $104_1$ can comprise an xDSL modem.

The subscriber premises device 104 can further comprise a display interface $104_2$ for connecting to a display (such as a monitor, a television screen or the like) and for conveying to the display a signal representing the content of the content stream 140.

The subscriber premises device 104 can further comprise a control port $104_3$ for receiving control signals from a control device, such as a remote control or the like. It should be understood that the control port $104_3$ can be adapted to receive control signals over infra-red waves, UHF, Bluetooth® or any other suitable transmission medium.

The subscriber premises device 104 can further comprise a processor $104_4$ that can be used for controlling other components of the subscriber premises device 104 (such as the content interface $104_1$, the display interface $104_2$, the control port $104_3$ as well as other components). The processor $104_4$ can access a memory $104_5$ for storing information (such as interactive applications and other information, as will be described in greater detail herein below). Any suitable type of the memory $104_5$ can be used, such as random-access memory.

The subscriber premises device 104 can comprise a number of other interfaces and components, all these interfaces are well known to those skilled in the art and, as such, need not be described here in any detail. For instance, the subscriber premises device 104 can comprise an internal clock.

From the above, it should be apparent that the processor $104_4$ is operable to receive signals via the content interface $104_1$ and to attempt locating a content stream (such as the content stream 140) within the received signals. If the content stream 140 is detected, the processor $104_4$ is operable to decrypt and decode the received content stream 140 and to generate one or more signals representing a portion of the decoded and decrypted content stream. The processor $104_4$ can either convey the so-generated signals to a viewer via a display connected to the subscriber premises device 104 via the display interface $104_2$ (ex. in case of video/audio content) or store the so generated signals in the memory $104_5$ (ex. in case of an iTV application or in case of a Personal Video Recorder application).

The processor $104_4$ is further operable to receive and interpret viewer commands via the control port $104_3$, to interpret the received commands and to take appropriate actions (ex. change channels, increase volume, invoke a menu mode, etc.).

It should be appreciated that the viewer who uses the subscriber premises device 104 may have access to other subscriber premises equipment located at subscriber premises 113 (such as home, vacation property, office or the like), such as a computing apparatus 120 which may comprise a PC, a desktop, a laptop, a wireless communication device (such as a cellular phone, a wireless e-mail device, a Personal Digital Assistant, etc.) or the like. It should be noted that in some embodiments of the present invention, the computing apparatus 120 and the subscriber premises device 104 may be embodied in a single apparatus, which may be the case with IPTV-based systems. The computing apparatus 120 is connected to a data network 121. In some embodiments of the present invention, the data network 121 can be the same as the distribution network 106. For instance, in case of an IPTV-based distribution network 106, both the data network 121 and the distribution network 106 may traverse the Internet. In other embodiments, the data network 121 can be distinct from the distribution network 106. For instance, in the scenario where the distribution network 106 comprises a satellite broadcast network or the cable-based network, the data network 121 may comprise a wide-area network (WAN) (such as the Internet) or the like that is independent of the distribution network 106.

It will be appreciated that in some embodiments of the present invention, the content provider 102 may also be connected to the data network 121 and as such, the viewer can access the content provider 102 using the computing apparatus 120 via the data network 121. For example, the content provider 102 may present myriad information (such as program listings, network maintenance information and the like) on a web site 142 that can be accessed by the viewer via the data network 121 using the computing apparatus 120. This web site 142 may be hosted and/or controlled by the content provider 102. Alternatively, the web site 142 may be hosted by a third party. For the sake of simplicity, this web site 142 is referred to herein below as a "content provider web site" 142.

For illustration purposes only, further description will rely on examples of a DTH satellite broadcast based system. However, it should be noted that these teachings equally apply to other types of distribution networks 106 including but not limited to cable based distribution networks, xDSL-based networks and IPTV-based networks.

The content provider 102 can comprise a conditional access and control module 108, a content acquiring module 110, a content processing module 112, a database 114, a real time data injection module 116 and a clock 118. The conditional access and control module 108 can be responsible for controlling other components of the content provider 102, to maintain subscriber profiles, service subscriptions detail and to perform billing functions. The conditional access and control module 108 may comprise one or more databases (not depicted) for storing subscriber profiles and service subscription details, and for maintaining billing schedules and the like. It will be appreciated that the one or more databases can be hosted locally on the conditional access and control module 108, or at another component of the content provider 102, or they can be accessed remotely by the conditional access and control module 108 via a network (such as the data network 121).

The content acquiring module 110 can be responsible for acquiring content from a plurality of content sources, of which only one content source 111 is depicted. This content is referred to herein below as "raw content" 111a. The nature of content sources 111 used depends on the arrangements that a particular content provider 102 has in place. It should be recognized that some content sources 111 may be operated by the content provider 102 and others may be operated by another content provider, such as an affiliate or a third party data aggregator.

The content processing module 112 can be responsible for compiling the raw content 111a acquired by the content acquiring module 110 from the content source 111 into a so-called "processed content" 111b, in accordance with bandwidth availability of a particular satellite transponder (not depicted). In other embodiments (in particular in case of IPTV-based systems), the content processing module 112 can be responsible for packetizing the acquired raw content 111a. In some other embodiments, the content processing module 112 can be responsible for digitizing the raw content 111a acquired from the content source 111. The content processing module 112 is further operable to process the acquired raw content 111a according to various compression methods, such as H.264, MPEG, MPEG-2, MPEG-4 and the like. The content processing module 112 can be further responsible for generating various additional delivery components and inserting them into the processed content 111b. As will be described in greater detail below, the content processing module 112 can receive an instruction from the conditional access and control module 108 and responsive to the received instruction to generate one or more delivery components.

Figure 6:
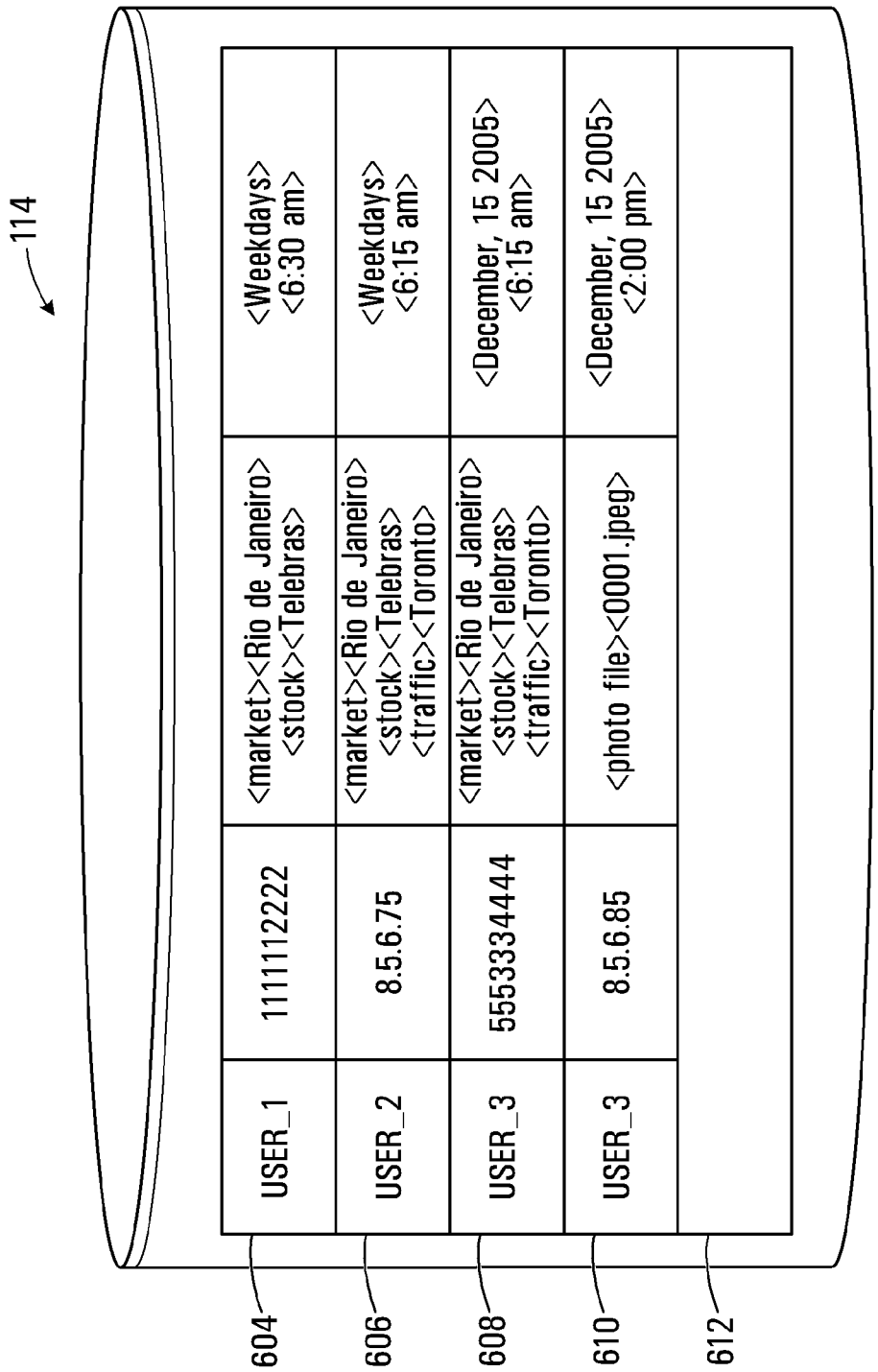
FIG. 6 is a schematic block diagram depicting a database for storing personalized content information.

The aforementioned database 114 which is accessible by the conditional access and control module 108 (which is logically depicted as 114a) may be used for storing a plethora of information, including a plurality of viewer profiles. With reference to FIG. 6, the content of the database 114 will now be described. The database 114 comprises a number of records, such as records 604, 606, 608 and 610. Each record can be associated with a particular viewer-selected content item provisioned by a respective viewer.

In this example, several viewers (USER_1 through to USER_3) have provisioned viewer-selected content items. The process by virtue of which a particular viewer can provision viewer-selected content will be described in greater detail herein below. A particular record within the database 124, the particular record associated with a particular viewer-selected content item maintains a relationship between (a) an identity of the viewer who has provisioned the viewer-selected content item, (b) an identifier of a target receiving device (such as the subscriber premises device 104); (c) an indication of the viewer-selected content item; and (d) an indication of viewing time. Needless to say, the particular record may comprise a number of further fields depicting further information about the viewer-selected content items.

Specifically, in one scenario for a hypothetical viewer-selected content item denoted in the record 604, the identity of the viewer can be USER_1. It should be noted that any suitable identity of the viewer can be used, such as but not limited to a telephone number, a customer number, an address, a user name, an identifier of the subscriber premises device 104 or the like. The identifier of a target receiver can be an identifier of the subscriber premises device 104 associated with the viewer, which in this case can be "1111112222". The indication of the viewer-selected content item in this case can comprise <market><Rio de Janeiro><stock><Telebras> depicting viewer interest in receiving a stock report associated with Telebras shares from the Rio de Janeiro stock exchange using a stock exchange report iTV application. The indication of time can comprise <daily><6:30 am> denoting viewer interest in viewing the personalized content every weekday at about 6:30 am.

In another scenario for a hypothetical viewer-selected content item denoted in the record 606, the identity of the viewer can be USER_2. The identifier of a target receiver can be an identifier of the subscriber premises device 104 associated with the viewer, which in this case can be an IP address "8.5.6.75". The indication of the viewer-selected content in this case can comprise <market><Rio de Janeiro><stock><Telebras> and <traffic><Toronto> depicting viewer interest in receiving a stock report associated with Telebras shares from the Rio de Janeiro stock exchange using a stock exchange report iTV application and traffic report(s) from Toronto using a traffic report iTV application. Naturally, the two types of personalized content (in this case comprising the stock report(s) and the traffic report(s) can be delivered via a single iTV application or via different sub-routines of a single iTV application. The indication of time can comprise <weekdays><6:15 am> denoting viewer interest in viewing the personalized content every week day at about 6:15 am.

In another scenario, it is assumed that a particular viewer (such as USER_3) has selected more than one user selected content items and, as such, two records (i.e. record 608 and 610) have been stored in the database 114 associated with the USER_3. For a hypothetical viewer-selected content item denoted in the record 608, the identity of the viewer can be USER_3. The identifier of a target receiver can be an identifier of the subscriber premises device 104 associated with the viewer, which in this case can be an IP address "100.110.120.187". The indication of the viewer-selected content item in this case can comprise <market><Rio de Janeiro><stock><Telebras> and <traffic><Toronto> depicting viewer interest in receiving stock report(s) associated with Telebras shares from the Rio de Janeiro stock exchange using a stock exchange report iTV application and traffic report(s) from Toronto using a traffic report iTV application. It should be noted that the two types of personalized content (in this case comprising the stock report(s) and the traffic report(s)) can be delivered via a single iTV application or via different sub-routines of a single iTV application. The indication of time can comprise <Dec. 15, 2005><6:15 am> denoting viewer interest in viewing the personalized content on Dec. 15, 2005 at about 6:15 am.

For a hypothetical viewer-selected content item denoted in the record 610, the identity of the viewer can also be USER_3. The identifier of a target receiver can be an identifier of the subscriber premises device 104 associated with a third party viewer, who in this case may be different from the viewer who has provisioned the viewer-selected content item. As will be described in greater detail herein below, the viewer can provision viewer-selected content item for viewing by the third party viewer. As such, the identifier of the target receiver can be an identifier of the subscriber premises device 104a associated with the third party viewer, which in this case may be an IP address "8.5.6.85". The indication of the viewer-selected content item in this case can comprise <photo><0001.jpeg> depicting viewer interest in enabling a third party viewer to download and view an image file, which in this exemplary scenario, can be "0001.jpeg". It should be noted that the format of the image file used is not particularly limited and any suitable image file format can be used. It should be further appreciated that any type of file (such as but not limited to a word processor document, a slide presentation, a spreadsheet, a calendar event, a meeting invite, an electronic message, a video clip, a video sequence and the like) can be used for the purposes of this invention. The indication of time can comprise <Dec. 15, 2005><2:00 pm> denoting that the viewer would like the third party viewer to be able to view the personalized content on Dec. 15, 2005 at about 2:00 pm.

The database 114 can contain a number of other records associated with other viewer-selected content item, generally and collectively depicted at 612.

It should be noted that the content of the records 604-610 has been depicted in pseudo code for illustration purposes only. One skilled in the art will realize various means to implement this pseudo code, which can include using XML, HTML and other suitable content mark up and description languages.

With continued reference to FIG. 1, the real time injection module 116 can be responsible for encoding and encryption of the processed content 111b into the content stream 140 and to transmit the content stream 140 to the subscriber premises devices 104. In some embodiments of the present invention, the real time injection module 116 receives the processed content 111b from the content processing module 112, and encodes and encrypts the processed content 111b according to known encoding and encryption techniques. Once the processed content 111b is encrypted into the content stream 140, the real time injection module 116 is operable to transmit the content stream 140 to the plurality of subscriber premises devices 104 via the distribution network 106. The exact method of transmission depends on the type of the content provider 102 (ex. Direct to Home satellite broadcaster, cable distributor, IPTV distributor, xDSL distributor or the like) and the corresponding distribution network 106 (ex. satellite, cable, Internet or the like).

Clock 118 can be responsible for maintaining current time. The clock 118 can be maintained and updated with the current time in any known manner, such as but not limited to GPS-based updates, etc.

Given the architecture of FIG. 1, it is possible to deliver the content stream 140 to the subscriber premises device 104. The content stream 140 can contain content such as movies, news, sports events, adult entertainment, financial data, software code for interactive television (iTV) applications and the like. The nature of the iTV applications is not particularly limited and, as such, can include but is not limited to applications that convey traffic reports, weather reports, financial reports, sporting events reports, news reports, zodiac reports, games, navigational applications, photo exchange applications, video clip exchange application, chat applications, dating applications, etc.

In the first scenario, it is assumed that it is desired to deliver an interactive television (iTV) application generally depicted at 150 to a viewer located in the subscriber premises 113. The way the interactive application is delivered to the viewer is not particularly limited. In some embodiments, the iTV application 150 can be delivered on-demand or, in other words, code for the iTV application 150 can be downloaded from the content stream 140 into the memory $104_5$ when the viewer wishes to use the iTV application 150. In other embodiments, the iTV application 150 can be stored in the memory $104_5$ and activated by the viewer when the viewer wishes to use the iTV application 150.

It is further assumed that the viewer located at subscriber premises 113 is interested in obtaining personalized content using the iTV application 150. At this point, it is important to distinguish "personalized content" from "non-personalized" (or generic) content. For the purposes of this description, the term "non-personalized" content is meant to refer to a type of content that is intended to more than one viewer. To use the example of traffic reports, a traffic report from Toronto may be of interest to a plural number of viewers and the plural number of viewers may want to access the Toronto traffic report using their respective iTV application 150. The non-personalized content can be generally continually broadcast to all customer premises devices 104 with an identifier of the non-personalized content item being distributed. In a non-limiting example, the Toronto traffic report can be broadcast in a generic broadcast component with an identifier comprising <traffic report><Toronto>. The customer premises device 104 that is associated with the viewer who is interested in the particular non-personalized content item is provisioned with a token that identifies the non-personalized content of interest (i.e. "Toronto traffic report"). When a match is found between the non-personalized content received at a particular customer premises device 104 and the token stored therein, the subscriber premises device 104 conveys the non-personalized content to the viewer.

The personalized content, on the other hand, is a content item that is compiled specifically for a particular viewer in accordance with the viewer's specific interest (or as indicated by a third party). The key difference is that a specific personalized content item is compiled and distributed to a specific viewer. As will be discussed in greater detail herein below, the teachings of this invention allow the content provider 102 to optimize available bandwidth by mixing personalized and non-personalized content to satisfy the interest of the majority of viewers.

For illustration purposes only, it is assumed that the viewer at subscriber premises 113 is interested in personalized stock exchange report(s). It should be understood that the teachings of the instant invention are not limited to this particular type of personalized content. Rather, the teachings of this invention can be applied to other types of personalized content, such as but not limited to traffic reports, weather reports, sport event reports, news reports, games, navigational applications, photo exchange applications, video clip exchange application, chat applications, dating applications, and other specialized, regional or industry specific data. It should be noted that other examples of other information of interest to one viewer or a limited subset of viewers within a large population of viewers will become apparent to those of skill in the art.

With reference to FIGS. 2, 2A-2D various embodiments for soliciting a so-called "viewer choice" are now described. The viewer choice is representative of the viewer's interest in a particular personalized content item to be distributed via an iTV application, as well as a viewing time.

In one embodiment described with reference to FIGS. 2 and 2A, the viewer can submit the viewer choice by using the computing apparatus 120. In one specific non-limiting example, the viewer can access the aforementioned content provider web site 142 using the computing apparatus 120 via the data network 121. The viewer can access the content provider web site 142 in a conventional manner, by clicking a link, entering an URL or the like. The viewer may be required to log into a dedicated portion of the content provider web site 142, for example by providing a user name and password combination that was assigned to or created by the viewer. Any other suitable means for logging in can be used.

Figure 2:
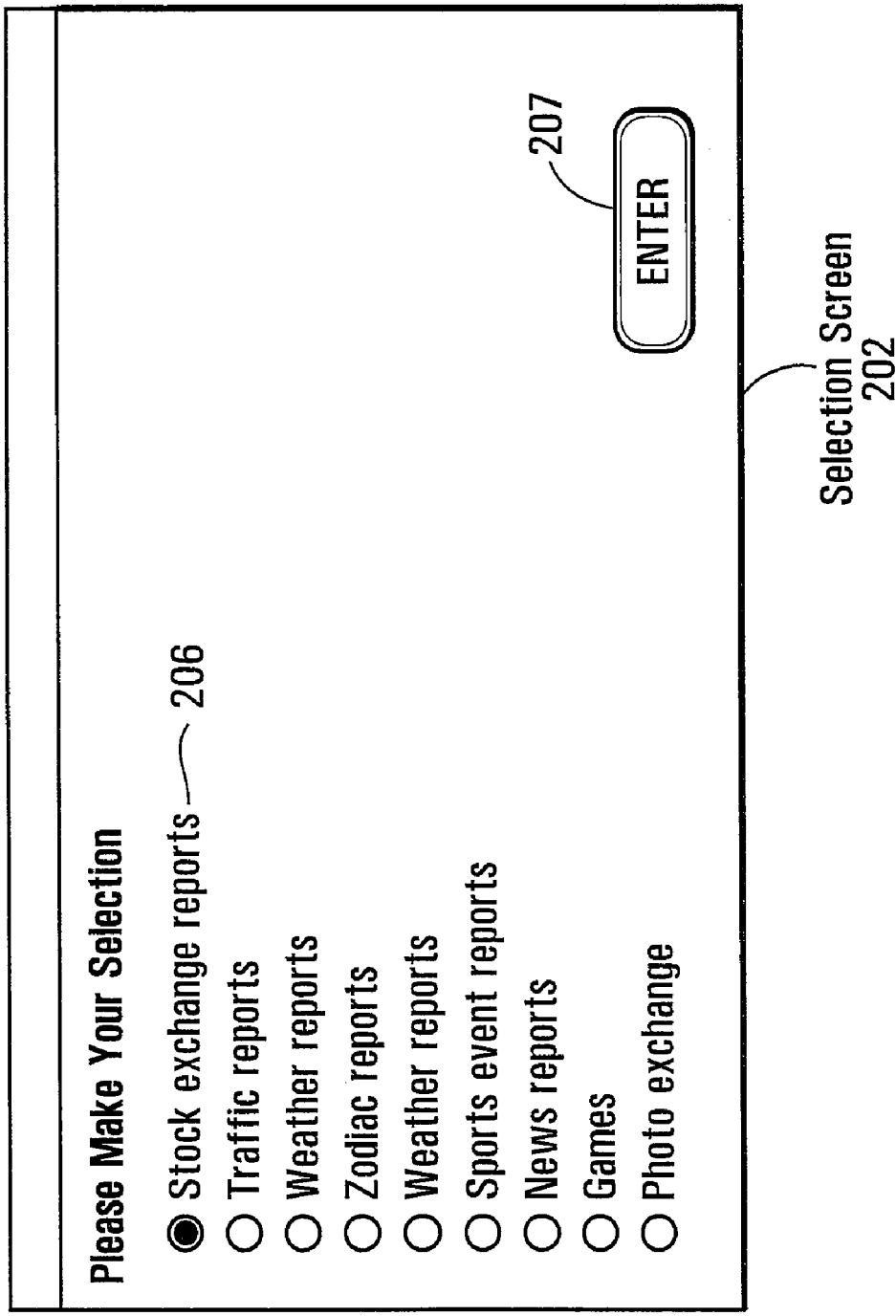
FIGS. 2, 2A-2D are block diagrams schematically representing various Graphical User Interfaces (GUIs) for accepting a selection parameter according to various embodiments of the present invention.
Figure 2A:
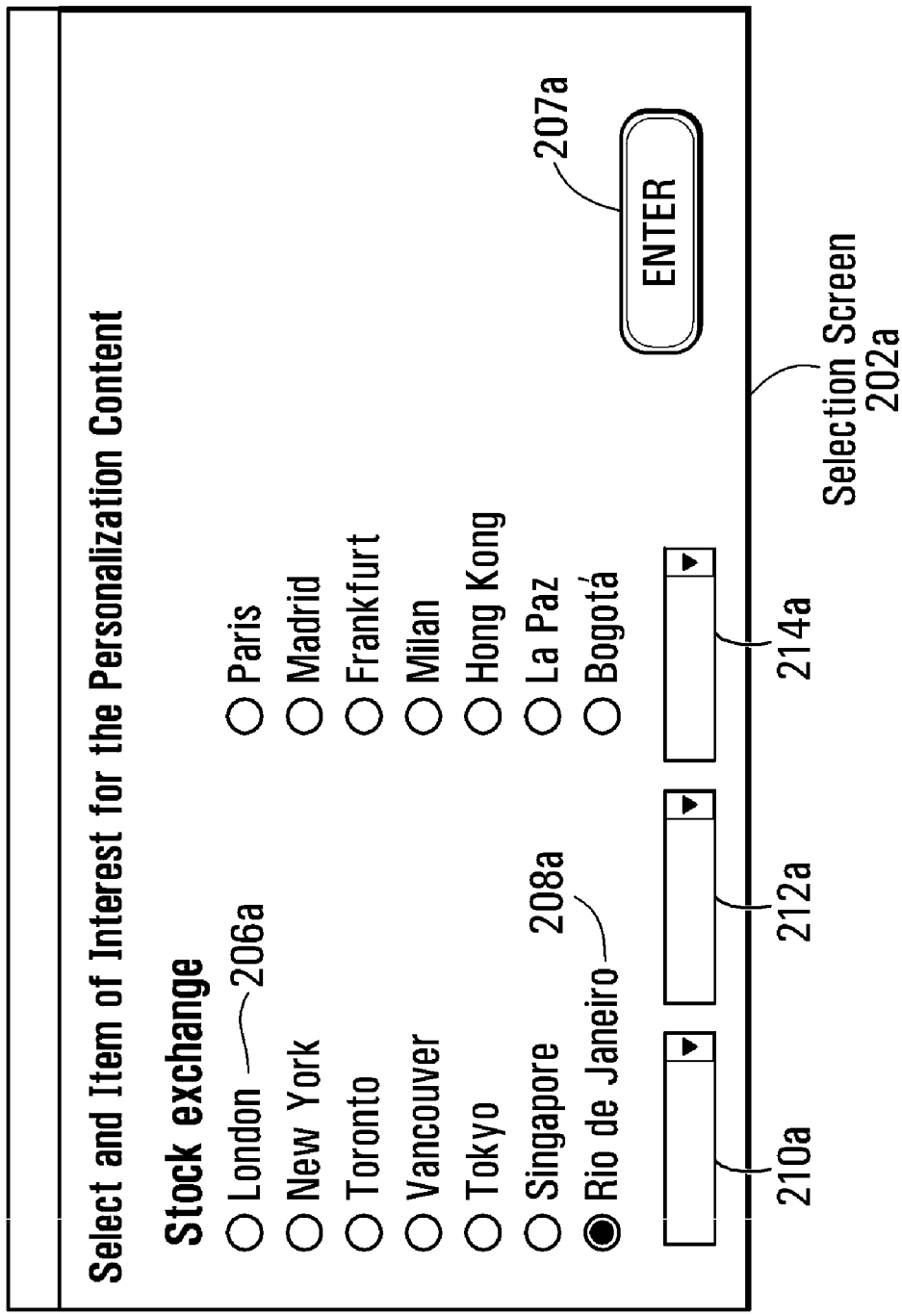

Once the viewer accesses the content provider web site 142, the viewer may be provided with a selection screen 202 of FIG. 2. The selection screen 202 can solicit viewer input in respect to which iTV application the viewer wants to provision. In other words, the viewer can be asked to indicate what type of personalized content the viewer wishes to provision, for example the viewer may be asked to choose from a list of available iTV applications 150, such as but not limited to stock exchange reports, traffic reports, weather reports, sport event reports, news reports, games. It should be understood that a number of alternative choices can be provided. In an alternative embodiment, the viewer may be asked to choose from a list of categories available in a single iTV application 150. In these embodiments, a single iTV application may be used to deliver a wide variety of personalized content, such as but not limited to stock exchange reports, traffic reports, weather reports, sport event reports, news reports, games, etc.

The viewer can provide her viewer choice by means of clicking a mouse on a check button associated with the specific item of interest. It should be understood that any other method for ascertaining the viewer choice can be used, such as receiving the viewer choice by means of a remote control, keyboard, joystick, touchpad, touch screen, voice controlled device and the like. Furthermore, it should be understood that even though the selection screen 202 is depicted using check buttons, other types of interfaces can be used, such as radio buttons, drop down menus and the like.

In this particular example, the viewer is interested in the stock reports from a Rio de Janeiro stock exchange and, as such, selects "stock exchange reports" 206. An "enter" button 207 can be provided to confirm viewer selection.

It should be noted that the selection screen 202 is generally used to select specific content for further selection screens. To illustrate, if the viewer has selected stock exchange reports 206 using the selection screen 202, a selection screen 202a containing a list of stock exchanges will be presented. Had the viewer selected a different category (such as traffic reports); a different selection screen 202a would have been presented (for example, containing a list of cities/parts of a city for traffic reports).

It should be noted that in some embodiments of the present invention, the selection screen 202 can be omitted. Specifically, if a single iTV application 150 is used to deliver plural types of personalized content, the selection screen 202 need not be used.

The selection screen 202a may present the viewer a number of choices for the viewer to select from based on the specific interest of the viewer manifested using the selection screen 202. In other words, the user choice(s) provided using the selection screen 202 can trigger the content presented to the viewer using the selection screen 202a. In the aforementioned scenario of the viewer interested in stock exchange report(s), the viewer may be presented with a list of stock exchanges from around the world. It should be understood that in other embodiments, the viewer may be presented with other choices, depending on specific interest area or iTV application 150.

In one specific non-limiting example, the check button beside "Rio de Janeiro" 208a is selected, and as such is blacked out, and the check button beside none of the other cities is selected. This represents viewer interest in Rio de Janeiro stock exchange report(s) only. In some embodiments of the present invention, the selection screen 202a may provide more granular selection choices to the viewer. For example, in case of the viewer being interested in Rio de Janeiro stock exchange, the selection screen 202a may provide a list of companies whose shares are traded on the Rio de Janeiro stock exchange, such as Telebras, Lightel SA, etc.

The selection screen 202a can further solicit an indication of a viewing time from the viewer, the indication of the viewing time indicating a time when the viewer would be interested in viewing the personalized content. In other words, the indication of time represents a time by which the subscriber premises device 104 should already have received the personalized content for conveying same to the viewer.

In one specific non-limiting example, the selection screen 202a can solicit frequency and time for the viewing of the personalized content. Specifically, a drop down menu 210a can provide a number of choices for frequency of viewing, such as but not limited to "daily", "weekly", "weekdays only", "weekends only", "every hour", "every 20 minutes", etc. A drop down menu 212a can provide a number of choices for viewing time in increments of 15 minutes or any other alternative time increments. It should be noted that the drop down menus 210a and 212a are described as examples only. It is contemplated that in some embodiments of the instant invention, only one of the drop down menus 210a and 212a is provided. It is further contemplated that rather than providing drop down menus 210a and 212a, the viewer may be asked to type in the viewing time and/or frequency. In alternative embodiments of the present invention, the viewer may be asked to key in a specific date when the viewer is interested in viewing the personalized content.

In some embodiments, the selection screen 202a can further solicit an indication of the viewer identity, for instance by providing an ID entry field 214a that can solicit the viewer to enter an identifier, such as but not limited to an identifier of the subscriber premises device 104 (such as a MAC address, an IP address, a device identifier or the like) or an identifier associated with the viewer subscription (such as a telephone number, a customer number, an account number and the like). It should be noted that the soliciting of the indication of the viewer identity can be performed simultaneously, before or after soliciting the indication of the viewer choice and the indication of the viewing time.

It should be noted that more than one viewer choice can be provisioned using the selection screen 202a. An "enter" button 207a can be provided to confirm the acceptance of the viewer choice. Alternatively, the viewer choice can be automatically accepted upon the viewer selecting one of the check buttons.

Upon the viewer confirming the viewer choice(s) (for instance, by clicking the "enter" button 207a), the content provider web site 142 generates a so-called "content selection token" that represents the viewer's choice(s), which in this scenario is generally depicted at 144 in FIG. 1. To illustrate, assume that the viewer has selected "Rio de Janeiro" for the personalized content and "6:30 am; weekdays" for the viewing time and frequency using the selection screen 202a. Once the viewer confirms her viewer choice(s), for instance by clicking on the "enter" button 207a, the content provider web site 142 is operable to generate the content selection token 144 comprising the viewer choice(s). Such a content selection token can be created as a text file, an XML file, a HTML file or using any other suitable file format.

The content provider web site 142 is further operable to insert the indication of the viewer identity, solicited using the ID entry field 214a into the content selection token 144. The content provider web site 142 stores and transmits the so-generated content selection token 144 to the content provider 102 via the data network 121 using one of the known techniques (such as web form, web form to e-mail, web form to database, JAVA scripts or the like). Specifically, the content provider web site 142 transmits the content selection token 144 to the aforementioned conditional access and control module 108 via the data network 121 for eventual storing in the database 144. The transmission of the content selection token 144 is logically depicted in a broken line A.

Upon receipt of the content selection token, the conditional access and control module 108 retrieves the viewer choice(s) from the content selection token and stores the indication of the viewer-selected item and the indication of viewing time in the aforementioned database 114 in association with the identifier associated with subscriber premises device 104. In some embodiments of the present invention, the conditional access and control module 108 can also forward a copy of the content selection token 144 to the subscriber premises device 104 for storing locally in the memory $104_5$. Specifically, the conditional access and control module 108 can send a portion of the content selection token 144 representing the viewing time and a channel associates with the specific iTV application 150. In case when the conditional access and control module 108 determines that the viewer-selected content is to be distributed as a non-personalized content (this will be described in greater detail here below), the conditional access and control module 108 also sends an indication of a non-personalized delivery component to the subscriber premises device 108.

It should be noted that in the above embodiments, the selection screen 202a can be presented to the viewer by the content provider web site 142 accessed by the viewer using the computing apparatus 120 or any other suitable device (such as but not limited to a wireless communication device, a cellular phone, a wireless e-mail device, a personal digital assistant (PDA), a selection kiosk or any other suitable device). In alternative embodiments, the selection screen 202a can be presented to the viewer on a screen of the computing apparatus 120 by an application running locally on the computing apparatus 120. It will be appreciated that such an application can be downloaded from the content provider web site 142 via the data network 121 and can be installed locally on the computing apparatus 120. Alternatively, the application can be installed onto the computing apparatus 120 using a CD-ROM, a dynamic wireless network, an USB/memory key or any other suitable means. Alternatively, the viewer may call the content provider 102 and provide his or her selection parameter over the phone to a customer service representative, in which case the computing apparatus 120 and the data network 121 are not be required.

In a variant of the above embodiment, rather than transmitting the content selection token 144 to the content provider 102, the content provider web site 142 or the application running on the computing apparatus 120, generates and presents to the viewer via the computing apparatus 120 a so-called "selection code" representing the viewer choice(s). In alternative embodiments, where the viewer has provided the viewer choices to a customer service representative, the selection code can be presented to the viewer over the phone. Specifically, the selection code can be a compact representation of the content selection token 144. In other words, the selection code can contain information of the content selection token 144 in part or in its entirety.

In one specific non-limiting example, the selection code can comprise an indication of the viewer-selected content item, an indication of the viewing time and an indication of a channel associated with a specific iTV application 150 for viewing personalized content. In other embodiments, the selection code can further comprise an indication of non-personalized content selected by the viewer. The selection code can be generated in a known manner and can comprise a unique combination of digits or alphanumeric symbols, such as 8 symbols, 16 symbols, 24 symbols or the like.

Figure 2B:
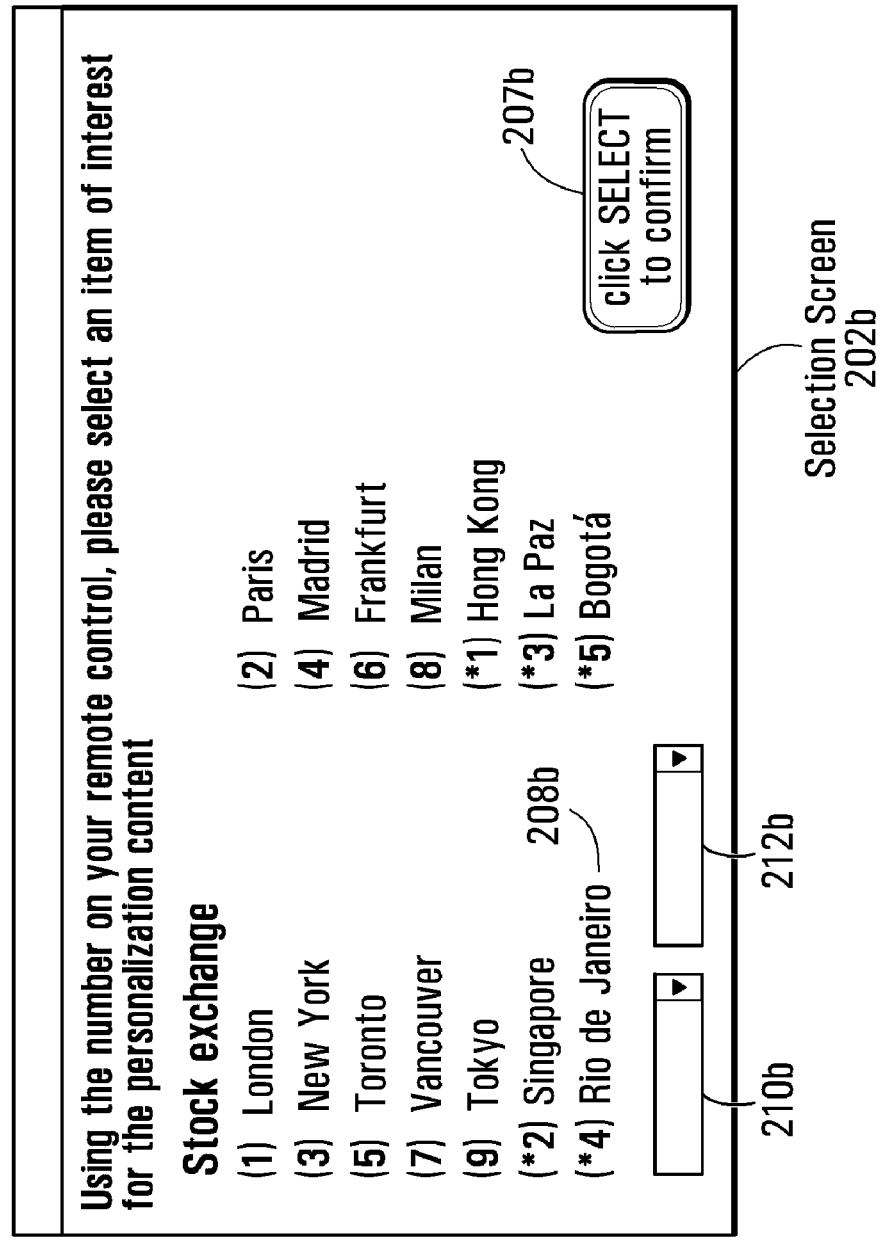
Figure 2C:
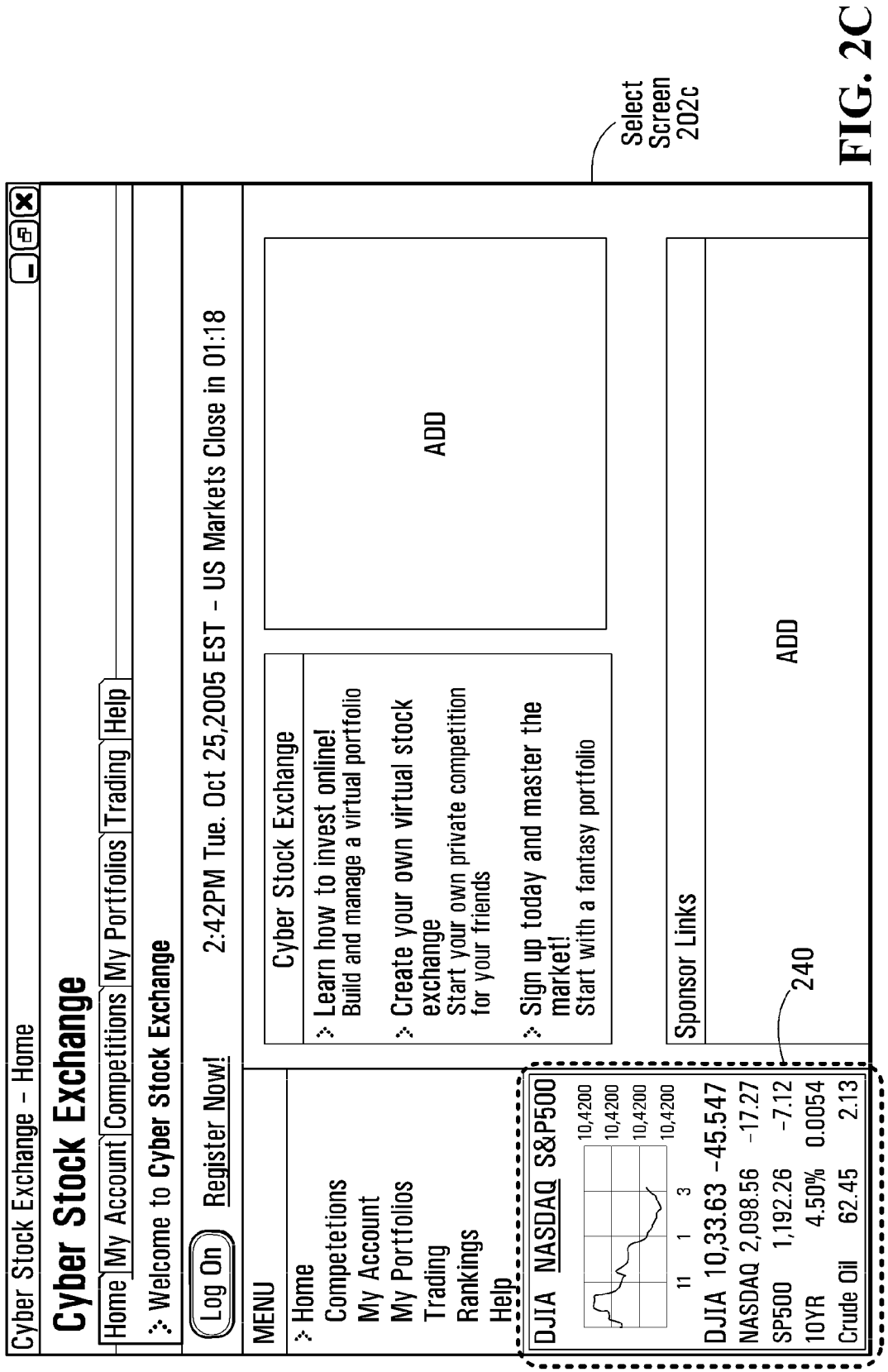
Figure 2D:
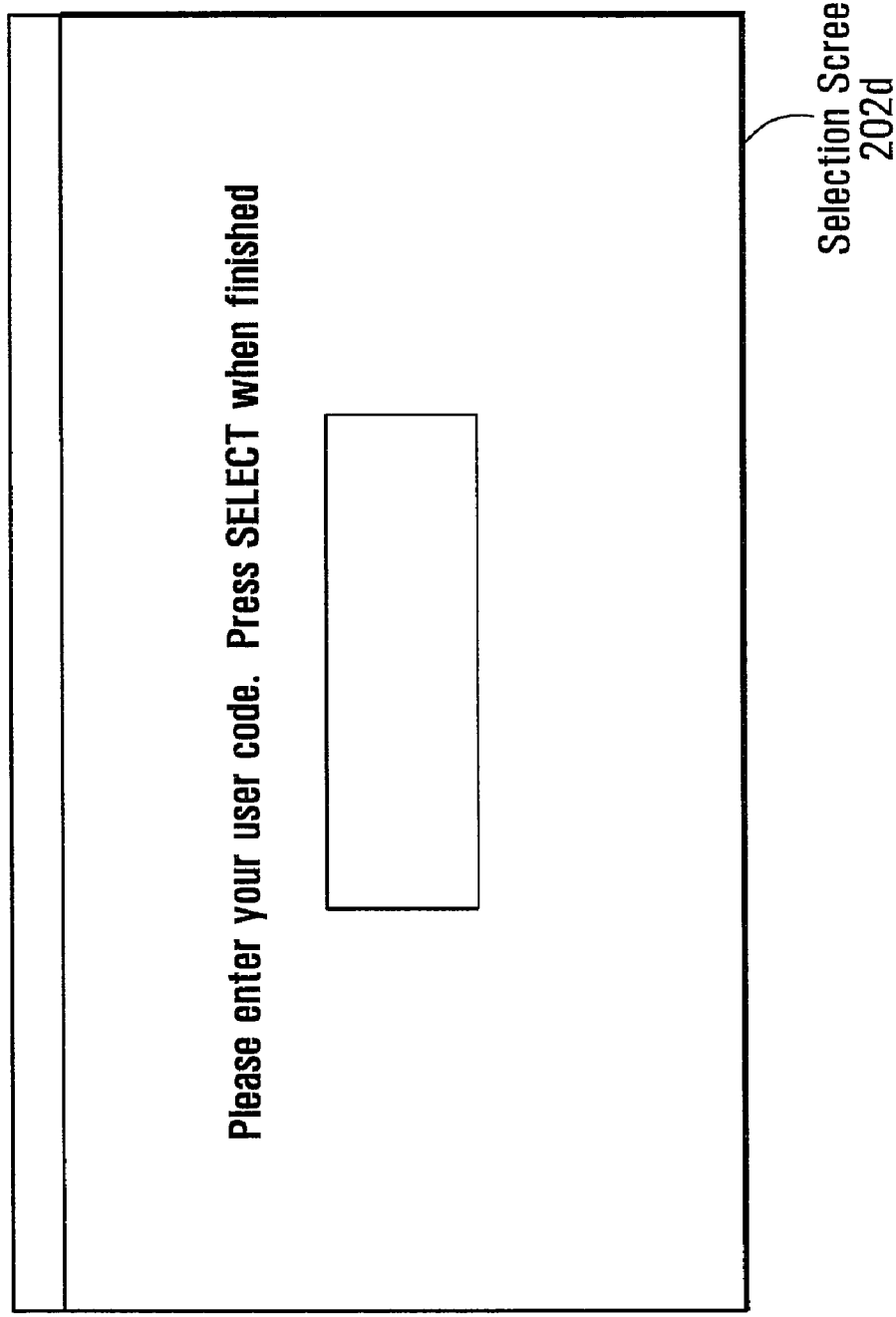

Once the viewer obtains the selection code, the viewer can submit the viewer choice to the subscriber premises device 104 by entering the selection code via a selection screen 202d depicted in FIG. 2D. The selection screen 202d for soliciting the selection code can be presented by an application running on the processor $104_4$ which can a first functional sub-routine of the Interactive Television (iTV) application 150. Specifically, the selection screen 202d can be conveyed by the subscriber premises device 104 onto the display coupled to the subscriber premises device 104 via the display interface $104_2$.

The viewer can enter the selection code using a remote control device and can confirm the selection using the "select" key of the remote control device or any other suitable key. Once the viewer confirms her entry, the processor $104_4$ is operable to decode and translate the received selection code into the content selection token, similar to the content selection token 144, containing an indication of viewer choice(s). Such a content selection token can be created as a text file, an XML file, a HTML file or using any other suitable file format. The processor $104_4$ is further operable to insert an identifier associated with the subscriber premises device 104 (such as a user ID, a MAC address associated with the subscriber premises device 104 or the like) into the content selection token.

The processor $104_4$ stores and transmits the so-generated content selection token to the content provider 102. The transmission of the content selection token can be implemented by one of the known means, such as via a back channel (such as but not limited to a telephone line connection, a wireless connection and the like), via the distribution network 106, etc. It should be noted that the processor $104_4$ can further store a copy of the content selection token locally. Specifically, the processor $104_4$ can store the indication of viewing time, the indication of the channel associated with the iTV application 150 and/or an indication of non-personalized content selected by the viewer.

Upon receipt of the content selection token, the content provider 102 retrieves the viewer choice(s) from the content selection token and stores the indication of the viewer-selected content item and the indication of viewing time in the aforementioned database 114 in association with the identifier associated with subscriber premises device 104.

In an alternative embodiment described with reference to FIG. 2B, the viewer can submit the viewer choice(s) by using the subscriber premises device 104. A selection screen 202b for soliciting viewer choice(s) can be presented by a second functional routine of the iTV application 150 or by another application running on the processor $104_4$.

The selection screen 202b can be conveyed by the subscriber premises device 104 onto the display coupled to the subscriber premises device 104 via the display interface $104_2$. The viewer can provide her viewer choice(s) using the keys of a remote control. In one specific non-limiting example, each category can be provided with a numerical code, such as (1) for "London", (3) for "New York", (*4) for the "Rio de Janeiro" and so on. The viewer can enter one or more choices by entering the appropriate digits using the keys of the remote control. The selection screen 202b can further provide an entry field 210b and an entry field 212b to solicit the indication of the viewing time, such as but not limited to a frequency of viewing, a time for viewing, etc. It should be noted that any suitable means other then the entry fields 210b, 212b for soliciting the indication of the viewing time can be used.

The viewer may be invited to confirm her selection by clicking the "select" key or any other appropriate key of the remote control ("Click SELECT to confirm" 207b). Upon the viewer confirming the viewer choice(s), the processor $104_4$ generates a content selection token that represents the viewer choice(s) substantially similar to the content selection token 144. The processor $104_4$ can generate the content selection token as a text file, an XML file, a HTML file or using any other suitable file format. The processor $104_4$ is further operable to insert an identifier associated with the subscriber premises device 104 (such as a user ID, a MAC address associated with the subscriber premises device 104 or the like) into the file containing the content selection token. The processor $104_4$ stores and transmits the so-generated content selection token to the content provider 102. The transmission of the content selection token can be implemented by one of the known means, such as via a back channel (such as but not limited to a telephone line connection, a wireless connection and the like), via the distribution network 106, etc. In some embodiments of the present invention, the processor $104_4$ can alternatively or additionally store a copy of the content selection token locally.

Upon receipt of the content selection token, the content provider 102 retrieves the viewer choice from the content selection token and stores the indication of the viewer-selected item and the indication of viewing time in the aforementioned database 114 in association with the identifier associated with subscriber premises device 104.

In yet another alternative embodiment, depicted in FIG. 2C, the viewer can submit the viewer choice(s) by using the computing apparatus 120 and a so-called "web crawler" application or a suitable search engine application. In one specific non-limiting example, the viewer can access a web site potentially associated with an item of interest, for instance a stock exchange web site (referred to herein below as "resource web site") depicted as selection screen 202c. The viewer can access the resource web site in a conventional manner, by clicking a link, entering an URL or the like.

Using the web crawler application, the viewer may indicate her interest in a specific personalized content, for example by drawing a selection box 240 around the item of interest. In other embodiments of the present invention, the viewer may indicate her interest in a personalized content using a touch screen, a voice recognition application and the like. The web crawler application can be further adapted to solicit viewer input representing an indication of the viewing time. The web crawler application can be further adapted to solicit an indication of viewer identity that is known to the content provider 102, such as an account number, a telephone number, an identifier associated with the customer premises device 104 and the like. It should be noted that the soliciting of the indication of viewer identity can be performed upon original log-in or after the viewer has indicated the viewer choice to the web crawler application.

The web crawler application can capture the indication of the viewer-selected content item and the viewing time, as well as the indication of the viewer identity into a content selection token that is substantially similar to the content selection token 144. Such a content selection token can be created as a text file, an XML file, a HTML file or using any other suitable file format. In some embodiments of the present invention, the web crawler application may further insert an address associated with the resource web sites, such as URL or other suitable address. The web crawler application transmits the so-generated content selection token to the content provider 102 via the data network 121 using one of the known techniques (such as web form, web form to e-mail, web form to database, JAVA scripts or the like). Upon receipt of the content selection token, the content provider 102 retrieves the viewer choice from the content selection token and stores the indication of the viewer-selected item and the indication of viewing time in the aforementioned database 114 in association with the identifier associated with subscriber premises device 104.

It should be understood that in some embodiments of the present invention, the soliciting and obtaining of the viewer choice(s) can combine one or more selection screens (such as selection screens 202, 202a, 202b) to solicit different components of the viewer choice(s). For instance, a selection screen similar to the selection screen 202a presented on the screen of the computing apparatus 120 can be used to solicit and obtain the indication of the viewer-selected content. A selection screen similar to the selection screen 202b conveyed by the subscriber premises device 104 can be used to solicit and obtain the indication of the viewing time. In these embodiments, the subscriber premises device 104 can transmit a copy of the indication of the viewing time to the content provider 102 in addition to maintaining the indication of the viewing time on the memory $104_5$.

Figure 3:
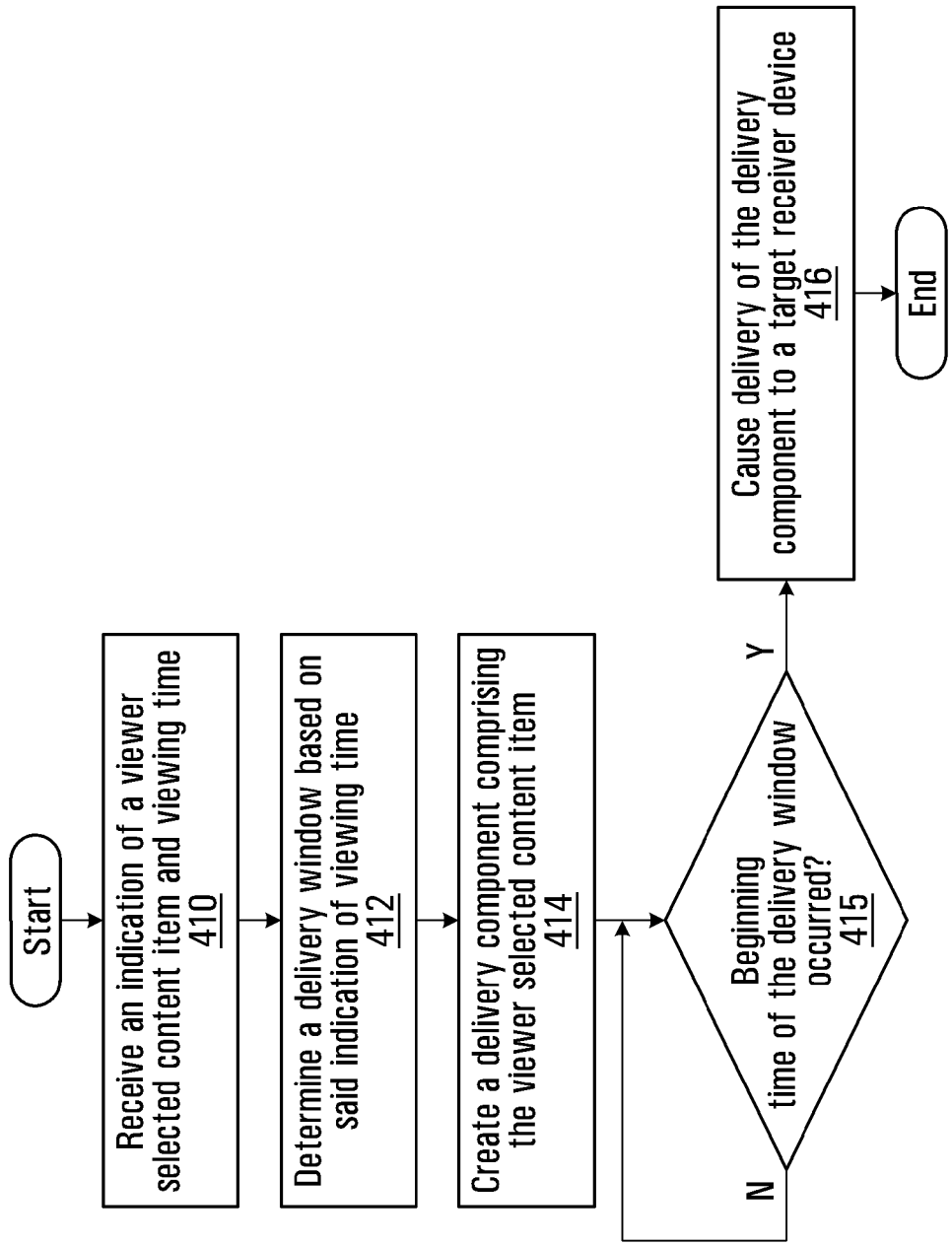
FIG. 3 is a block diagram schematically depicting a method for conveying personalized content.

With reference to FIG. 3, a method for conveying personalized content to a viewer will now be described. The method of FIG. 3 can be conveniently executed by the conditional access and control module 108, but this need not be so in every embodiment. For the purposes of the foregoing discussion, it is assumed that a particular viewer has provided one or more viewer choice(s) using one of the selection screens 202, 202a, 202b, 202c or 202d discussed with reference to FIGS. 2, 2A-2D. For illustration purposes only, it is assumed that the particular viewer has indicated an interest in viewing stock report(s) from the Rio de Janeiro stock exchange every weekday at 6:30 am. As such, a record 604 has been created and stored in the database 114. It is further assumed that an iTV application for stock report(s) is running on content stream 140 and the content stream 140 can be accessed by tuning the subscriber premises device 104 to channel 525. It should be emphasized that all these assumptions are meant for illustration purposes only and should not be used to limit the instant invention.

At step 410, an indication of a viewer-selected content item and an indication of a viewing time are received. Specifically, the conditional access and control module 108 can access the database 114 and retrieve the content of record 604. The conditional access and control module 108 retrieves an indication of viewer identity (i.e. the network identifier of the subscriber premises device 104, which in this example is "11225567"), an indication of the viewer-selected content item (i.e. in this example, <market><Rio de Janeiro><stock><Telebras>) and an indication of the viewing time (i.e. in this example, <weekdays><6:30 am>).

At step 412, the conditional access and control module 108 determines a delivery window based on the viewing time. Specifically, the conditional access and control module 108 determines when the delivery of the viewer-selected item should be initiated to ensure that the viewer-selected item is delivered to the subscriber premises device 104 by the time indicated by the indication of the viewing time, so as to make it available for conveyance to the viewer at or after the viewing time.

In some embodiments of the present invention, the delivery window can be 30 seconds prior to the viewing time, 1 minute prior to the viewing time, 15 minutes prior to the viewing time, 30 minutes prior to the viewing time, 60 minutes prior to the viewing time. It should be understood that any suitable delivery window that ensures that the viewer-selected content item is delivered to the subscriber premises device 104 in time to be conveyed to the viewer at or after the viewing time could be used.

At step 414, the conditional access and control module 108 generates a delivery component containing the viewer-selected content item. First, the conditional access and control module 108 obtains the viewer-selected content item. How the conditional access and control module 108 obtains the viewer-selected content item is not particularly limiting. In some embodiments of the present invention, the conditional access and control module 108 instructs the content acquiring module 110 to requests the viewer-selected content item from the content source 111, which may be the case with obtaining a customized traffic report, a customized weather report or the like. In other embodiments, the viewer-selected content item may be already stored at one of the aforementioned databases associated with the conditional access and control module 108 (this may be the case, if a particular item has already been requested and previously retrieved, etc.). In these embodiments, the conditional access and control module 108 retrieves the viewer-selected content item from the one or more of its internal databases (not depicted).

Yet in further embodiments, the conditional access and control module 108 may obtain the viewer-selected content item through the data network 121. Specifically, in the aforementioned scenario of the viewer using a web crawler application to provide her viewer choice(s), the conditional access and control module 108 can use the web address information contained in the content selection token to access the aforementioned resource web site and retrieve the viewer-selected content item.

Figure 5:
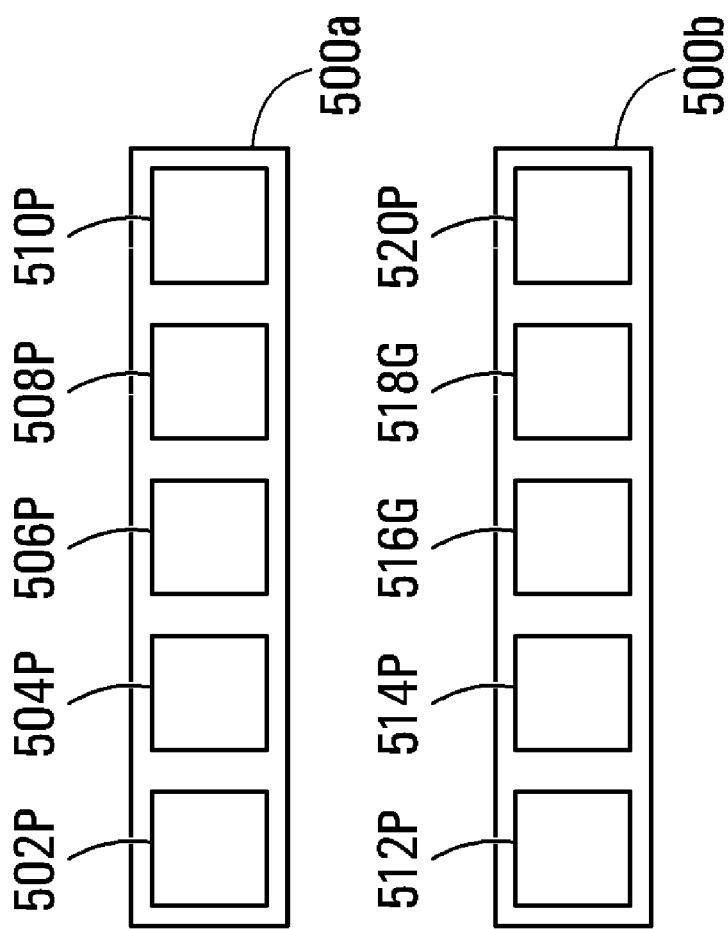
FIG. 5 is a schematic representation of a broadcast stream according to two embodiments of the present invention.

Once the conditional access and control module 108 obtains the viewer-selected content items, the conditional access and control module 108 instructs the content processing module 112 to generate the delivery component. In the aforementioned satellite scenario, the content processing module 112 generates a module suitable for delivery to the customer premises device 104 by broadcasting via a broadcast stream. How the content processing module 112 generates the delivery component will depend on the type of content requested by the viewer and whether it falls within the personalized category or non-personalized category. To illustrate, a reference is made to FIG. 5 that schematically illustrates two instances of a broadcast stream—a broadcast stream 500a and a broadcast stream 500b. The broadcast stream 500a comprises a number of delivery components, namely delivery components 502P to 510P, which can be broadcast repetitively or "carouselled" until they are replaced by other deliver components or until they have timed out. All delivery components 502P to 510P contain personalized content selected by one or more viewers. Each of the delivery components 502P to 510P have been provisioned with an indication of an identity of the viewer who has selected the particular personalized content contained therein.

The broadcast stream 500b also comprises a number of delivery components, such as delivery components 512P, 514P and 520P that contain personalized content. The broadcast stream 500b also comprises delivery components 516G and 518G containing non-personalized (or generic content). Each of the delivery components 516G and 518G contains non-personalized content or, in other words, content that is intended for distribution to more than one viewer. Each of the delivery components 516G and 518G has been provisioned with an identifier of the content contained therein (ex. "Traffic Report Toronto" or "Weather Report Montreal") to enable a particular subscriber premises device 104 to acquire the delivery component if the viewer associated with the particular subscriber premises device 104 is interested in the particular content contained in the particular deliver component 516G or 518G. Each of the deliver components 512P, 514P, 516G, 518G and 520P are streamed repeatedly in a broadcast carousel until they are replaced or have timed out.

It should be understood that the decision which content is to be distributed in a personalized delivery component and which content is to be distributed in a non-personalized delivery components is made by the content provider 102. To illustrate, if more then one viewer is interested in traffic reports from Toronto, it is likely that the traffic reports from Toronto will be continuously delivered in a non-personalized delivery component (such as delivery component 516G). On the other hand, if only one or a few viewers are interested in traffic reports from Berlin, the traffic reports from Berlin are likely to be delivered on demand in a personalized delivery component (such as delivery component 512P).

In the scenario of a satellite-based broadcast network and in case of the personalized broadcast component, the token will comprise an identifier of the subscriber premises device 104 for which the token is destined.

In the aforementioned cable scenario, the content processing module 112 generates a token suitable for delivery to the customer premises device 104 via the coaxial cable based distribution network 106. In this scenario, the token will again comprise an identifier of the subscriber premises device 104 for which the token is destined. In the aforementioned IPTV distribution scenario, the content processing module 112 generates a TCP/IP packet suitable for delivery to the subscriber premises device 104 via the packet-based distribution network 106, which in this case is a data network adapted for supporting television-over-packet distribution. In this scenario, the identifier associated with the subscriber premises device 104 for which the token is destined can be inserted into a TCP/IP packet header.

At step 415, the conditional access and control module 108 determines if a beginning time of the delivery window has occurred. Specifically, the conditional access and control module 108 checks if the beginning time of the delivery window matches the current time maintained by the aforementioned clock 118. If the beginning time of the delivery window does not match the current time (i.e. the "NO" branch of step 415), the conditional access and control module 108 returns to step 415 and continues to monitor whether the beginning time of the delivery window matches the current time.

For the sake of this discussion, it is assumed that the beginning time of the delivery window indeed matches the current time (i.e. the "YES" branch of step 415), at which point the conditional access and control module 108 proceeds to step 416.

At step 416, the conditional access and control module 108 causes the delivery component to be delivered to the subscriber premises device 104 during the delivery window determined at step 412. Specifically, in the aforementioned satellite scenario, the conditional access and control module 108 instructs the real time injection module 116 to place the delivery component onto the broadcast stream (such as the broadcast stream 500a or 500b) at the beginning of the delivery window. In some embodiments of the present invention, the delivery component is left in the broadcast stream until the end of the delivery window. In other embodiments, the deliver component is left in the broadcast stream only for a portion of the delivery window, the portion being large enough to allow the subscriber premises device 104 to acquire the delivery component from the broadcast stream, or until the bandwidth is required for another delivery component, or a combination of these factors. In the aforementioned cable and IPTV scenarios, the delivery component is transmitted to the subscriber premises device 104 at or following the beginning of the delivery window using one of the known delivery techniques.

How the subscriber premises device 104 receives the delivery component will naturally depend on the type of the distribution network 116. Using the satellite broadcast scenario as an example, the process for receiving the delivery component will now be described. In order to receive the delivery component, the subscriber premises device 104 should be switched on and tuned to the appropriate channel (in this example, channel 525 carried within the content stream 140). It will be recalled, that the content selection token containing user choice(s) can be stored at the processor $104_1$. By virtue of storing the user choice(s) locally, the processor $104_1$ effectively knows what customized content and what viewing time the viewer has selected. By extracting the indication of the viewer-selected content item, the processor $104_1$ can determine which channel it should be tuned to. For example, if the viewer has selected customized stock exchange report(s), then a channel associated with the iTV application 150 will be selected. As has been described above, the channel associated with the iTV application 150 can be channel 525.

By extracting the indication of the viewing time, the processor $104_1$ can determine at what time it should be awoken or, in other words, switched on to receive the delivery item containing the viewer-selected item. As such, the processor $104_1$ can invoke an auto-switch on function at a time which occurs a pre-determined time interval before the viewing time, which can conveniently equal to the beginning of the delivery window. The processor $104_1$ can furthermore auto-tune to the required channel associated with a specific iTV application, which in this scenario is channel 525. It should be noted that it is also contemplated that the viewer can manually switch on the customer premises device 104 and tune it to the required channel before the viewing time. Such as, if the viewer in interested in the stock report at 6:30 am, she may manually switch on the customer premises device 104 at 6:00 am and tune it to channel 525. Yet in an alternative embodiment of the instant invention, the processor $104_1$ can tune into the required channel to download the viewer-selected content in the background while the viewer is enjoying a program on another channel. As will be appreciated by those of skill in the art, the subscriber premises device 104 comprises two or more tuners in this embodiment, When the subscriber premises device 104 receives the delivery component, the processor $104_1$ retrieves the viewer-selected content item from the delivery component and conveys it to the viewer. The processor $104_1$ can trigger automatic conveyance of the viewer-selected content item upon occurrence of the viewing time. Specifically, the processor $104_1$ can trigger a display connected to the display interface $104_2$ to turn on and, as such, the viewer-selected content item can be automatically conveyed to the viewer at the viewing time. In an alternative embodiment, the conveyance can be performed at a later time. In other words, the viewer can manually switch on the display at a time occurring after the viewing time and enjoy the viewer-selected content. In yet further embodiments, the processor $104_1$ can store the delivery component in the memory $104_5$ for future retrieval by the viewer.

Figure 4A:
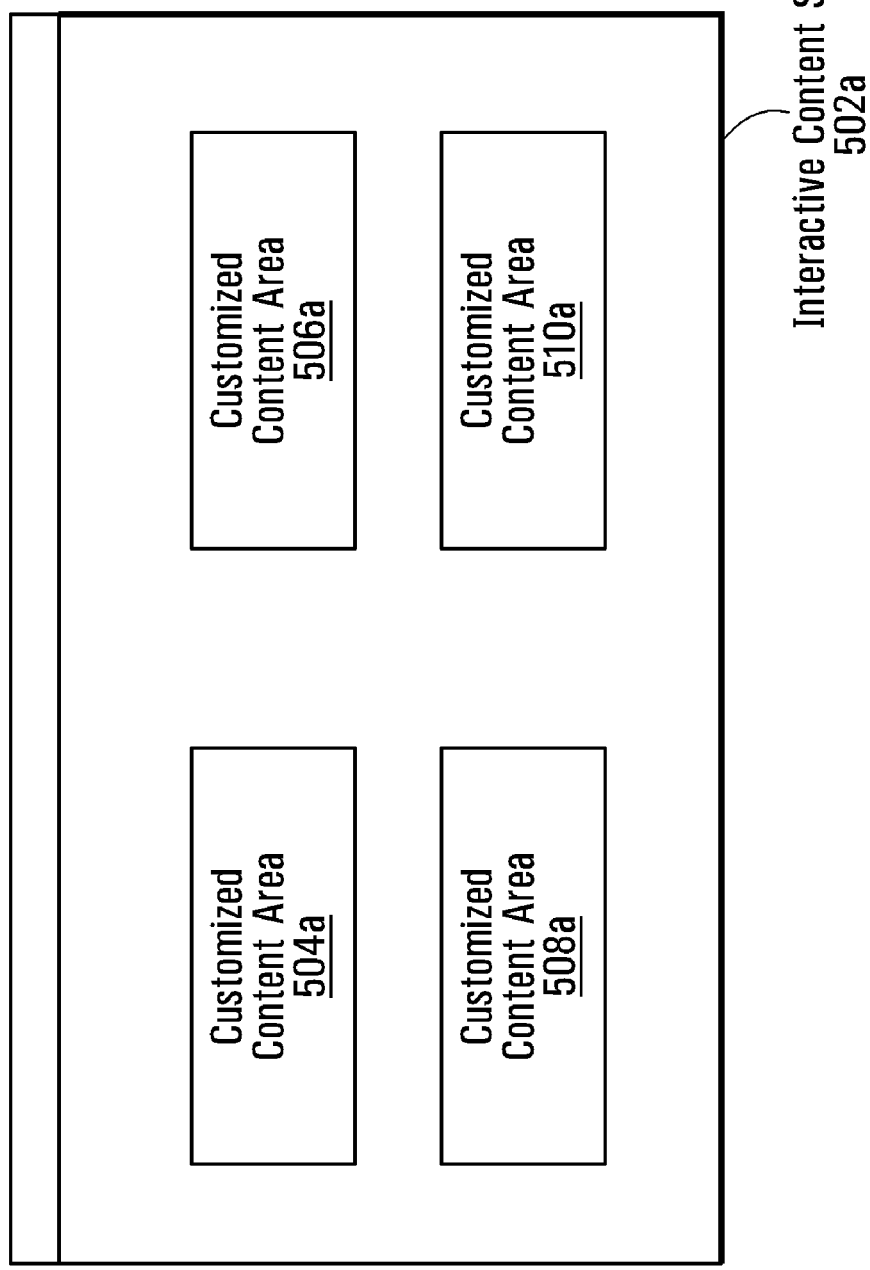
FIGS. 4A-4B are block diagrams schematically representing interactive content screens for conveying the personalized content according to two embodiments of the present invention.

With reference to FIG. 4A, which depicts an interactive content screen 502a, one embodiment for conveying the viewer-selected content item will now be described. In the aforementioned scenario of the viewer requesting a stock exchange report from the Rio de Janeiro stock exchange, the viewer-selected content item containing the Rio de Janeiro stock exchange information can be displayed in a customized content area 504a. It should be appreciated, that the viewer may have selected a number of viewer-selected content items, and as such, the interactive content screen 502a can comprise a number of additional customized content areas, such as customized content areas 506a, 508a and 510a. It should now be clear, that using the aforementioned method and the interactive content screen 502a, the viewer can receive customized content, such as the Rio de Janeiro stock exchange information, in the customized content area 504a, La Paz stock exchange information in the customized content area 506a, Milan stock exchange information in the customized content area 508a and Madrid stock exchange information in the customized content area 510a. It should be understood that examples of personalized content presented herein above are not meant to be limiting in any way. Other examples of personalized content can include results of cricket matches in Pakistan, ski conditions at Copper Mountain, aviation weather forecast for a specific airport, etc. Yet further examples of personalized content will be apparent to those of skill in the art.

Figure 4B:
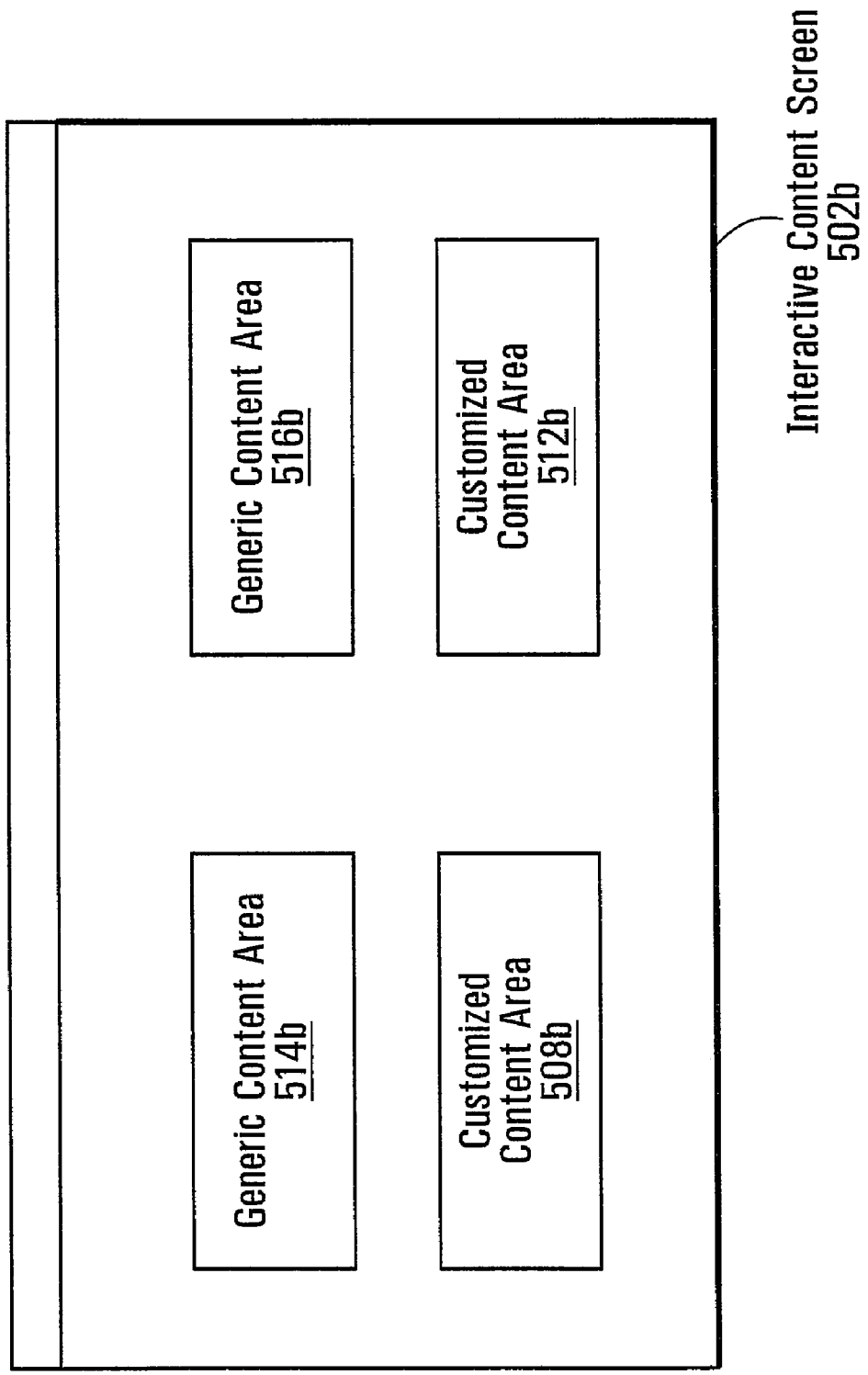

In an alternative embodiment depicted in FIG. 4B, the interactive content screen 502b contains two customized content area 508b and 512b, as well as two generic content areas 514b and 516b. The generic content areas 514b and 516b can be used to deliver generic content distributed via the aforementioned non-personalized delivery components, such as but not limited to, control information, navigation information, advertising material, service provider selected generic content for distribution to all viewers and the like.

It should be understood that the layout of interactive content screens 502a and 502b is merely exemplary and can be varied without departing from the teachings of this invention.

The aforementioned exemplary description has been provided with reference to a scenario whereby a viewer provisions viewer-selected content item for her own viewing. It is contemplated that in an alternative scenario, a viewer can provision a viewer-selected content item for viewing by a third party viewer. One specific non-limiting example of this scenario will now be described.

A viewer residing at subscriber premises 113 may want to provision a viewer-selected content item for a viewer residing at the subscriber premises 113a. For example, the viewer residing at the subscriber premises 110a can be a mother of the viewer residing at the subscriber premises 113. It may be desirous for the viewer residing at the subscriber premises 113 to send a personalized content item, for instance containing kids' photos or a video clip, to the viewer residing at the subscriber premises 113a. In this exemplary scenario, the viewer residing at the subscriber premises 113 may want to ultimately simplify the receiving of the personalized content by the viewer residing at the subscriber premises 113a. The teachings of this invention allow the viewer residing at the subscriber premises 113 to provision the personalized content item to be received at a specific time by the viewer residing at the subscriber premises 113a. Effectively, the viewer residing at the subscriber premises 113a can receive the personalized content by tuning her subscriber premises device 104a into a pre-determined channel (or a pre-determined iTV application) at or after a pre-determined time.

It should be understood that in this embodiment, the provisioning of the viewer-selected content item can include the viewer residing at the subscriber premises 113 uploading the files that she wants to be incorporated into the personalized content. The uploading may be conveniently performed using the content selection screen 202*a* conveyed by the computing apparatus 120. However, it should be understood, that any other suitable content selection screen, such as the content screen 202*b* conveyed by one or more functional sub-routines of the iTV application 150 residing on the memory $104_5$ of the processor $104_4$ can be used. In case that the content screen 202*b* conveyed by the processor $104_4$ is used, the files can be uploaded using one of a USB-connected storage device (such as a digital camera, an mp3 player, etc.), memory key, floppy disk, CD-ROM, wireless or wired connection with the computing apparatus 120 or any other suitable means. Once the viewer-selected content item has been provisioned, the viewer residing at the subscriber premises 113 may advise the viewer at the subscriber premises 113*a* to tune her subscriber premises device 104*a* to a particular channel at or after a particular time to receive the personalized content. Needless to say, that the viewer-selected content item can be delivered to the subscriber premises device 104*a* for storage at the memory $104_{a5}$ for future retrieval by the viewer at the subscriber premises 113*a*.

Those skilled in the art will appreciate that in some embodiments, certain functionality of the conditional access and control module 108 and/or the processor $104_4$ may be implemented as pre-programmed hardware or firmware elements (e.g., application specific integrated circuits (ASICs), electrically erasable programmable read-only memories (EEPROMs), etc.), or other related components. In other embodiments, the conditional access and control module 108 and/or the processor $104_4$ may comprise an arithmetic and logic unit (ALU) having access to a code memory (not shown) which stores program instructions for the operation of the ALU in order to execute the various processes described above. The program instructions could be stored on a medium which is fixed, tangible and readable directly by the conditional access and control module 108 and/or the processor $104_4$, (e.g., removable diskette, CD-ROM, ROM, or fixed disk), or the program instructions could be stored remotely but transmittable to the conditional access and control module 108 and/or the processor $104_4$ via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Persons skilled in the art will appreciate that there are yet further alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method for execution by a content provider comprising:
    presenting a graphical user interface on a screen connected to a target receiver device to request inputting of an indication of a report, an indication of a desired time of viewing and an indication of a desired frequency of viewing;
    determining a delivery window based at least on the desired time of viewing;
    requesting content for the report;
    generating a delivery component including a completed report and an identifier associated with the target receiver device; and
    causing the delivery component to be delivered to the target receiver device during the delivery window, wherein said causing comprises:
        broadcasting the delivery component to a plurality of receiver devices, the plurality of receiver devices comprising the target receiver device; and
        exclusively authorizing the target receiver device to acquire the delivery component;
    wherein said requesting, said generating and said causing are carried out at the desired frequency of viewing.

2. The method of claim 1, wherein said screen is implemented as part of a computer.

3. The method of claim 1, wherein said screen is implemented as part of a television.

4. The method of claim 1, wherein said screen is implemented as part of a wireless communication device, a cellular phone, a wireless e-mail device or a Personal Digital Assistant.

5. The method of claim 1, further comprising soliciting the viewer to provide said identifier associated with the target receiver device.

6. The method of claim 1, further comprising soliciting the viewer to provide said indication of a desired time of viewing.

7. The method of claim 1, wherein said determining a delivery window comprises calculating a delivery beginning time which occurs at a pre-determined time interval before the desired time of viewing, the pre-determined time interval being sufficient for the target receiver device to acquire said delivery component.

8. The method of claim 1, further comprising determining whether said viewer-selected content comprises generic content and, in the affirmative, said causing the delivery component to be delivered further comprises:
    compiling a generic broadcast component;
    broadcasting said generic broadcast component to the plurality of receiver devices;
    transmitting an identifier of said generic broadcast component to the target receiver device to enable said target receiver device to acquire said generic broadcast component during the delivery window.

9. The method of claim 8, wherein said transmitting an identifier is performed before said transmitting said generic broadcast component.

10. The method of claim 1, wherein said indication of a report comprises a selection code.

11. The method of claim 1, wherein said causing the delivery component to be delivered further comprises inserting said delivery component into a broadcast stream at a beginning of said delivery window.

12. The method of claim 11, further comprising maintaining said delivery component on said broadcast stream until an end of said delivery window.

13. The method of claim 11, further comprising maintaining said delivery component on said broadcast stream for a portion of said delivery window, said portion sufficient to enable the target receiver device to acquire said delivery component.

14. The method of claim 1, wherein said causing the delivery component to be delivered comprises packetizing said delivery component and forwarding said packetized delivery component to the target receiver device.

15. The method of claim 1, further comprising receiving an indication of an identifier of the target receiver device.

16. The method of claim 1, further comprising downloading an iTV application to said target receiver device.

17. A set top box registered to a viewer, the set top box comprising:

a first interface operable to receive a content stream from a content provider;

a second interface adapted to receive from the viewer an indication of a report, an indication of a desired time of viewing and an indication of a desired frequency of viewing;

a processing unit coupled to said first and second interfaces, the processing unit operable for:

effecting a transmission to the content provider of said indication of a report, said indication of a desired time of viewing and said indication of a desired frequency of viewing, said transmission being instrumental in causing a delivery component to be broadcast to all potential recipient set top boxes before the viewing time, the delivery component comprising a completed report for the viewer;

waking up at a pre-determined time before the desired time of viewing to acquire the delivery component from the content provider by the desired time of viewing via said first interface; and conveying the completed report to the viewer wherein the waking up and the conveying are carried out at the desired frequency of viewing.

18. The set-top box of claim 17, wherein the processing unit is operable for effecting said transmission via said first interface.

19. The set top box of claim 17, wherein said set-top box comprises a third interface for connecting to a telephone line; and wherein the processing unit is operable for effecting said transmission via said third interface.

20. The set-top box of claim 17, wherein said second interface is operable to receive signals from a control device.

21. The set-top box of claim 17, wherein said first interface is adapted for satellite broadcast reception.

22. The set-top box of claim 17, where said first interface is adapted for a coaxial cable transmission.

23. The set-top box of claim 17, wherein said first interface is adapted for receiving said content stream from an xDSL-based distribution system.

24. A system for content delivery, comprising:

a target receiver device;

a content provider for distributing a content stream to a plurality of receiver devices, the plurality of receiver devices including the target receiver device; the content provider operable for:

presenting a graphical user interface on a screen connected to the target receiver device to request inputting of an indication of a report, an indication of a desired time of viewing and an indication of a desired frequency of viewing;

determining a delivery window based at least on the desired time of viewing;

requesting content for the report;

generating a delivery component including a completed report and an identifier associated with the target receiver device; and causing the delivery component to be delivered to the target receiver device during the delivery window;

broadcasting the delivery component to a plurality of receiver devices, the plurality of receiver devices comprising the target receiver device; and exclusively authorizing the target receiver device to acquire the delivery component wherein said requesting, said generating and said causing are carried out at the desired frequency of viewing.

25. The system of claim 24, further comprising a broadcast distribution network connecting said target receiver device and said content provider.

26. The system of claim 25, wherein said broadcast distribution network comprises a satellite broadcast network.

27. The system of claim 25, wherein said broadcast distribution network comprises a coaxial cable distribution network.

28. The system of claim 25, wherein said distribution network comprises an xDSL-based distribution network.

29. The system of claim 24, wherein the screen is implemented as part of a computing apparatus connected to said content provider via a data network; and wherein said computing apparatus is operable to generate a selection code that represents at least a portion of said indication of a report.

30. The system of claim 29, wherein said computing apparatus is further operable to transmit said selection code to said content provider.

31. The system of claim 24, wherein said target receiver device is operable to store an indication of the desired time of viewing.

32. The system of claim 31, wherein said target receiver device is operable to wake up at a pre-determined time before the desired time of viewing to acquire the delivery component from said content provider.

33. The system of claim 24, further comprising a second receiver device; said second receiver device being operable to:

solicit an indication of the identifier associated with the target receiver device; and transmit said indication of the identifier associated with the target receiver device to the content provider.

34. The system of claim 24, wherein said target receiver device is operable to wake up at a pre-determined time before the desired time of viewing to acquire the delivery component from the content provider.

* * * * *